US005427252A

United States Patent [19]

Teegarden et al.

[11] Patent Number: 5,427,252

[45] **Date of Patent: * Jun. 27, 1995**

[54] AUTOMATED SYSTEM AND METHOD FOR SORTING AND STACKING REUSABLE CARTONS

[75] Inventors: Daniel J. Teegarden, Ellicott City; Andrew J. Gorman, Jr., Reisterstown, both of Md.

[73] Assignee: Westinghouse Electric Corporation, Pittsburgh, Pa.

[ * ] Notice: The portion of the term of this patent subsequent to May 4, 2010 has been disclaimed.

[21] Appl. No.: 57,249

[22] Filed: May 3, 1993

Related U.S. Application Data

[63] Continuation-in-part of Ser. No. 750,600, Aug. 28, 1991, Pat. No. 5,207,331.

[51] Int. Cl.[6] .......................... B07C 5/02; B65G 57/00; B65G 59/00

[52] U.S. Cl. .................................... 209/540; 209/542; 209/556; 209/583; 414/791.1; 414/796.4; 414/797; 271/4

[58] Field of Search ............... 209/539, 540, 541, 542, 209/546, 555, 556, 557, 580, 583, 600, 900; 198/349, 366; 271/3, 4, 6, 7; 414/790.9, 791.1, 795.4, 796.4, 797

[56] References Cited

U.S. PATENT DOCUMENTS

| | | | |
|---|---|---|---|
| 2,699,264 | 1/1955 | Bruce et al. | 414/792 |
| 3,039,381 | 6/1962 | Fitch | 209/604 X |
| 3,114,465 | 12/1963 | Widmer | 414/794 X |
| 3,282,398 | 11/1966 | Skoli et al. | 414/783 X |
| 3,448,867 | 6/1969 | Raynor et al. | 414/792.6 |
| 3,490,611 | 1/1970 | Andrews | 198/366 X |
| 3,580,391 | 5/1971 | Littlefield | 209/583 |
| 3,682,338 | 8/1972 | Von Gal, Jr. et al. | 414/796.2 |
| 3,776,396 | 12/1973 | Burt et al. | 414/796.8 |
| 4,026,421 | 5/1977 | Lotz | 414/794 X |
| 4,462,746 | 7/1984 | Smets | 414/330 |
| 4,494,655 | 1/1985 | Horii et al. | 209/900 X |
| 4,512,701 | 4/1985 | Foust et al. | 209/604 X |
| 4,547,115 | 10/1985 | Charbonnet | 414/796.4 |
| 4,586,612 | 5/1986 | Oberg | 209/555 |
| 4,615,902 | 10/1986 | Falcoff et al. | 209/580 X |
| 4,681,502 | 7/1987 | Staufner | 414/121 |
| 4,688,678 | 8/1987 | Zue et al. | 209/900 X |
| 4,838,435 | 6/1989 | Alexandre et al. | 209/555 X |
| 4,905,843 | 3/1990 | Holbert | 209/539 X |
| 4,966,271 | 10/1990 | Jenkner | 414/927 X |
| 4,988,263 | 1/1991 | Odenthal | 414/795 |
| 5,207,331 | 5/1993 | Teegarden et al. | 209/556 |
| 5,238,120 | 8/1993 | Ballestrazzi et al. | 209/539 |

FOREIGN PATENT DOCUMENTS

| | | | |
|---|---|---|---|
| 3604806 | 8/1987 | Germany | 203/539 |
| 0012250 | 2/1981 | Japan | 414/7909 |

OTHER PUBLICATIONS

Teegarden, *Carton Sorting System,* Nov. 1, 1990.

*Primary Examiner*—David H. Bollinger
*Assistant Examiner*—Tuan N. Nguyen

[57] ABSTRACT

A system and method for automatically processing a supply of cartons, in flattened form and of different types, in accordance with a selectable number of plural, different and separately identifiable carton types. Unsorted cartons are removed in successive layers from stacks thereof and transported in serial succession along a transport path. Sorting modules are disposed along the transport path, each including respectively associated routing and stacking devices individually predesignated to receive and stack a given, identifiable carton type. A system controller tracks the progress of each carton, simultaneously for plural cartons, along the transport path and when a match of the carton type with a predesignated stacking device is determined, actuates the associated routing device to route a carton of a matching type from the transport path and to the associated stacking device for stacking. The system controller monitors the stack content of each stacking device and, when a first matching stacking device is full, automatically routes successive cartons of the common type to an alternate and commonly predesignated stacking device, if available. One or more overflow stacking devices is predesignated to receive identified cartons for which no stacking device has been predesignated and/or for which all matched stacking devices are full. Cartons which are not identifiable or which do not satisfy acceptable carton condition criteria are automatically transported to a reject bin.

5 Claims, 23 Drawing Sheets

AUTOMATED SYSTEM AND METHOD FOR SORTING AND STACKING REUSABLE CARTONS

CROSS REFERENCE TO RELATED APPLICATION

This is a continuation-in-part of application Ser. No. 07/750,600, filed Aug. 28, 1991, now U.S. Pat. No. 5,207,331, May 4, 1993.

BACKGROUND OF THE INVENTION

1. Field of the Invention

This invention relates to a system and method for automatically sorting collapsed cartons, based on carton size and/or type, for inspecting each carton, e.g., to assess integrity and other criteria as to suitability of the carton for purposes of reuse, and for stacking the sorted cartons in corresponding stacks of uniform carton size and/or type and in a desired orientation, thereby facilitating subsequent reuse of the cartons.

2. State of the Relevant Art

A manufacturer can ship its product from its factory in a variety of reusable cartons. These reusable cartons are eventually emptied, flattened and returned to the factory in an unsorted stack. Many hours are spent by plant personnel who sort these cartons by hand, typically stacking same in uniform size and/or type and orientation, on a pallet for transport to a filling station at which the cartons are re-erected and filled with the product and thus recycled, or reused.

A number of devices and systems are known in the prior art which provide for limited aspects of handling of cartons and containers and related pallets. Examples thereof are disclosed in U.S. Pat. Nos. 4,988,263, 4,681,502, 4,462,746, 3,776,396, 3,682,338, 3,448,867, 3,282,398 and 2,699,264. While these and other prior art systems may facilitate individual steps in the handling of cartons and may supplement and thus facilitate manual processing by plant personnel, none thereof provides for fully automated handling, sorting and related carton processing functions.

Accordingly, there is a significant need to automate these functions and thus to afford an automated system and method for sorting and stacking reusable cartons.

SUMMARY OF THE INVENTION

Accordingly, an object of this invention is to provide an automated system and method for sorting and stacking reusable, collapsed cartons.

Another object of the present invention is to automatically sort reusable, collapsed cartons by identifying a carton by a bar code printed on or applied to the carton.

Still another object of the present invention is to automatically sort reusable, collapsed cartons by identifying each carton in accordance with automated determination of its height and length dimensions.

A further object of the present invention is to sort a variety of reusable, collapsed cartons of different sizes and aspect ratios in an efficient and timely manner.

Still a further object of the present invention is to provide an automated carton sorting and stacking system of modular construction, which affords flexibility as to increasing the capacity of the system with regard to the number of sizes of cartons which can be automatically sorted and collated into plural stacks, each of a common and predesignated type, and which permits customization by virtue of the addition of modules of specialized functional type.

In accordance with the modular, automated system and method of operation of the present invention, a pallet of unsorted cartons is loaded onto an input queue module; in a preferred embodiment, plural such pallets are loaded onto the input queue module and, individually and sequentially, automatically advanced into position in a destacker module. In the destacker module, the cartons are removed in successive layers from the top of the stack on the pallet, each layer consisting of one larger or two smaller cartons, and the cartons are loaded in a vertically oriented position onto a corresponding submodule of a conveyor belt module. The conveyor belt module defines a path of transport from the destacker and comprises a first submodule which conveys the cartons from the destacker module to an orientation, identification and inspection module and through which a corresponding conveyor submodule transports the cartons. In accordance with respective, different embodiments of the invention, this latter module, in corresponding differing sequences, determines the identity of the carton (which may include determining the dimensions thereof) and the carton orientation and, further, functions automatically to reorient each carton, as needed, to assure that all cartons regardless of size or type have a common orientation, i.e., with a longitudinal edge corresponding to the length of the flattened carton disposed on the conveyor belt. The module further provides for automated inspection of the carton to determine its condition, based on desired criteria, and thus to establish whether the carton is suitable for reuse or is to be rejected. Either based on the sensed size dimensions of the carton or by scan signals produced by reading of a carton-type identifying bar code printed on the carton, a system controller identifies the carton type and determines whether a particular stacker bin has been predesignated for that carton type, and into which each such identified carton of that type is to be transported and stacked. One or more sorting modules are arranged in serial order, each comprising plural, e.g., four, such stacker bins preferably arranged as first and second pairs, each pair comprising a left and a right stacker bin, relative to the transport direction, each sorting module further includes a routing submodule likewise organized as first and second successive pairs, each pair comprising left and right routing submodules, relative to the direction of transport. Each stacker bin is predesignated to receive a particular size and type of carton, of the plurality of types and sizes of cartons which the system is set-up to accommodate for automatic sorting and stacking. The system controller tracks the progress of each carton through the system and automatically operates the routing submodules to capture a carton designated to be received in the respectively associated stacker bin and actuates the stacker mechanism of each stacker bin to receive and automatically stack the cartons in layers as a vertically aligned stack on a pallet within the stacker bin.

Sensors within each module detect the progress of the successive cartons therethrough and provide corresponding sensor output signals through an associated signal rack to the system controller. The system controller controls the time sequential operations of the successive modules and their respective, relatively asynchronous operation cycles, to achieve coordinated processing and transport of successive cartons of differing sizes through the succession of modules and ultimately into stacked relationship in the predesignated, corresponding stacker bins as well as to transport reject cartons to a reject bin. To this end, the system controller issues commands to actuators in the various modules to carry out correctly timed transport, routing and stacking functions.

Due to its modular construction, the automated sorting and stacking system of the invention can be readily expanded to accommodate as many different types of cartons as required. Further, for efficiency, where cartons are of dimensions such that two may be stacked side-by-side and thus in a common layer on the pallet, each sorting module processes two cartons for stacking side-by-side in a single, common layer, thereby to optimize through-put and to be consistent with manual practices and space economies. More than two cartons per layer, of course, could readily be accommodated. The system controller furthermore determines, through the corresponding sensor outputs, when a pallet of unsorted cartons in the destacker has been depleted of stacked cartons, for automatically advancing a successive pallet having a stacked or unsorted cartons thereon and for advancing the empty pallet to an output queue module; further, it issues alarm signals to alert an operator to remove the empty pallets and to supply additional pallets of unsorted cartons, as the need arises. It further produces output signals to an operator to indicate that a pallet in a stacker bin has received a full complement of stacked cartons and thus is to be removed and replaced with an empty pallet; additionally, it automatically reroutes collapsed cartons from a first to a second stacker bin also predesignated for that same size and type of carton, thereby to enable continuous sorting and stacking operations and avoid any unnecessary down-time otherwise associated with the removal of the fully stacked pallet from a stacker bin. The system controller furthermore responds to sensor outputs from the various modules not only for monitoring the successful progress of each carton through the system and coordinating the continuous and simultaneous processing of plural cartons in successive and respective time intervals through the successive modules but also to detect malfunctions such as carton jams and to effect alternate routing, where possible, and/or to effect system shutdown and to indicate the need for operator intervention.

These and other features and advantages of the present invention will become more apparent from the drawings and following detailed description.

DETAILED DESCRIPTION OF THE PREFERRED EMBODIMENT

Figure 1:
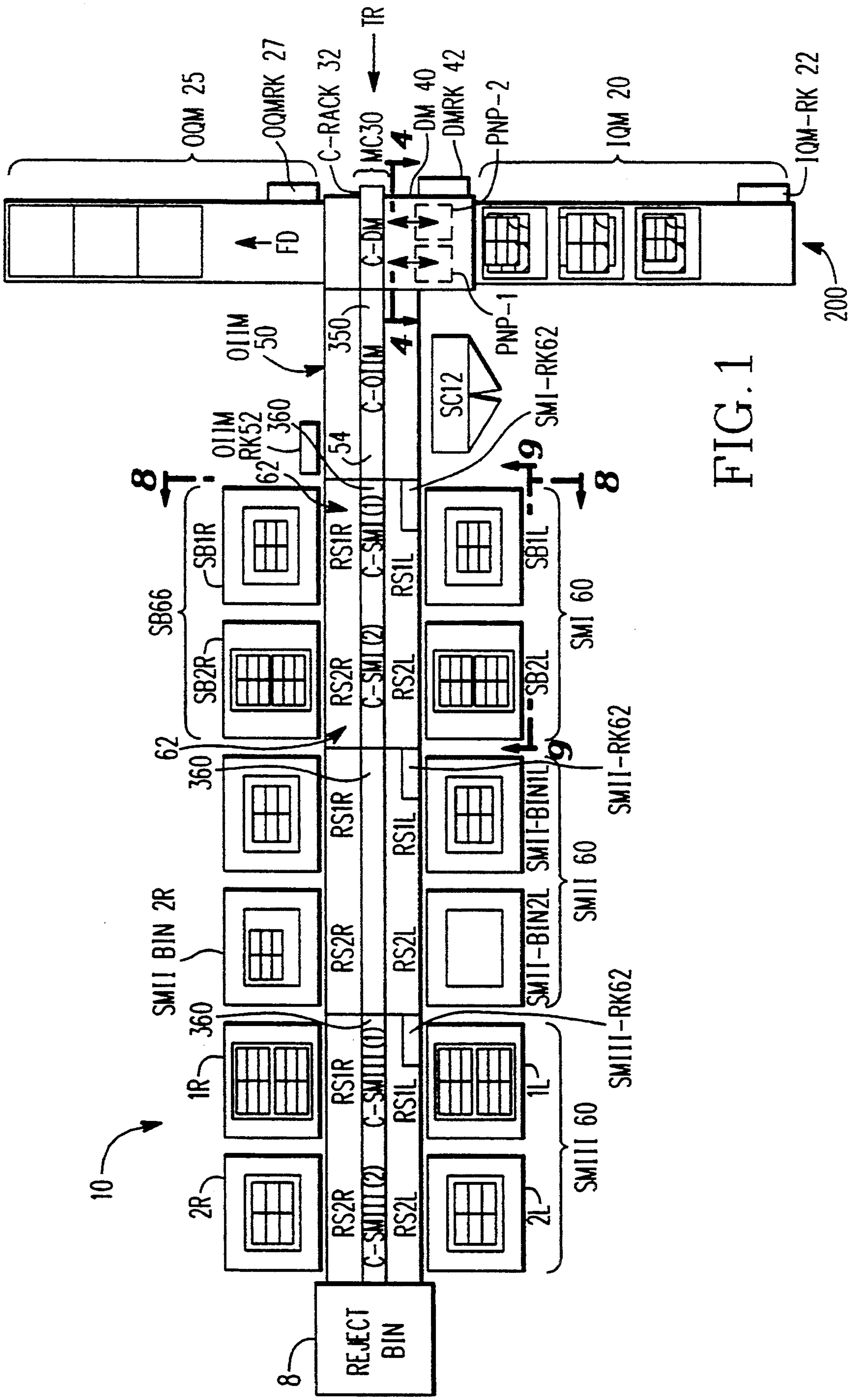
FIG. 1 is a plan view, in block diagram form, of the system of the invention and including, in a "T" configuration and as basic components, an input queue module (IQM), a destacker module (DM) and an output queue module (OQM) arranged in serial sequence along the short leg of the "T", a modular conveyor (C-) which extends from the destacker module transversely thereto and thus along the long dimension of the "T", and which transports cartons, in serial sequence and in a transport direction TR, past an orientation, identification and inspection module and plural, successive sorting modules.

The automatic carton sorting and stacking system 10 of the invention is of modular construction wherein individual modules, as later detailed, may operate asynchronously while overall, coordinated system operation is maintained by means of system controller 12 (SC 12). The various modules and components thereof are identified by acronyms in FIG. 1 and, as appropriate, in the remaining drawings, as indicated in the following.

Sorting modules 60, which are identical and of which three are illustrated, are designated as sorting modules I, II, III (SMI, SMII, SMIII) with respective signal racks (SMI-RK, SMII-RK, SMIII-RK) and respective first and second routing submodules 62; each routing submodule (RS) 62, of each sorting module 60, includes a first pair of left and right routing submodules (respectively, RS1L, RS1R) with a corresponding submodule of the conveyor 30 therebetween (C-SMI(1)) and a second pair of left and right such routing submodules (respectively, RS2L and RS2R) with an associated submodule of conveyor 30 (C-SMI(2)) therebetween; the four routing submodules 62 of a given sorting module 60 respectively being operated individually and selectively by the system controller 12 to route a carton, which has been identified and satisfactorily inspected, to a corresponding one of four associated stacker bins 66 (SB) including, correspondingly, a first pair of left and right stacker bins 66 (respectively, SB1L and SB1R) and a second such pair of left and right stacker bins 66 (respectively, SB2L and SB2R). As will be further explained, a carton which is not designated to have a destination in one of the four stacker bins 66 of a given sorting module accordingly is passed through that module to a next succeeding module, e.g., from SMI to SMII, SMIII, . . . until arriving at the appropriate and matching predesignated stacker bin of the subsequent module, as controlled by the system controller 12. Cartons which are not identified or are unacceptable for reuse (i.e., "rejects," as later explained) are transported by the modular conveyor 30 to a reject bin 8.

Figure 2A:
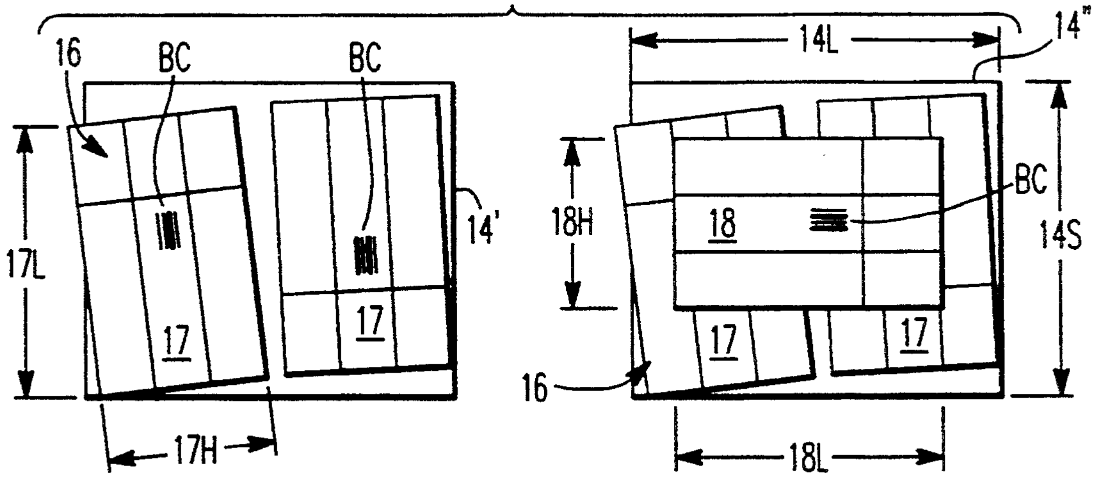
FIG. 2A is a schematic illustration of two different layers of cartons manually placed on respective pallets for subsequent, automated sorting and stacking in accordance with the invention and FIGS. 2B and 2C respectively illustrate two different sets of respective different sizes of cartons such as would be employed by two different manufacturers, exemplary of the carton types and corresponding identification and sorting requirements thus presented.

With respect to FIGS. 1 and 2A, pallets 14 (14' and 14'') are of uniform size, typically rectangular, and thus having a longer (length, or longitudinal) dimension 14L and a shorter (width) dimension 14H—have stacks 16 of flattened cartons thereon, each stack 16 comprising multiple layers of flattened such cartons. In FIG. 2A there is illustrated a pallet 14' having a layer of two smaller cartons 17 thereon, having respective length and height dimensions 17L and 17H and on the top layer of the stack 16 on the pallet 14'', a single, larger and flattened carton 18 having length and height dimensions 18L and 18H. The term "longitudinal dimension" as used herein means the greater dimension of the flattened carton, i.e., its "length", whereas "horizontal dimension" as used means the shorter dimension and thus the "height" of the flattened carton.

In accordance with the invention and common practice, the cartons are manually stacked on the pallets 14 such that for cartons of a size which can be so accommodated on the pallet 14, two smaller such cartons 17 are stacked in side-by-side or parallel relationship with their longitudinal dimensions transverse to the longitudinal axis of the pallet and which together, form a single carton layer; a larger carton 18 on the other hand is stacked singly and defines a corresponding layer, and is positioned with its longitudinal axis parallel to the longitudinal dimension, or length, 14L of the pallet 14''. Further, to afford stabilization, typically an individual flattened carton, termed a "tie carton", is interspersed periodically in a stack of two side-by-side smaller cartons 17, 17. Carton 18 in FIG. 2A functions as such a "tie carton,", but also illustrates the typical, intermixed and random stacking of cartons, including both larger cartons (single carton per layer) and smaller cartons (two cartons, side-by-side, per layer)—with either a larger or a smaller carton used a tie-carton layer—in successive carton layers on a pallet. The various cartons 17 on the pallets 14' and 14'' in FIG. 2A while not of the same size, are of the "smaller" category and thus are accommodated side-by-side in each layer, as stacked in the orientation indicated on the standard pallet 14; similarly, carton 18 is intended to be illustrative of a number of the "larger" category of cartons which may be of varying dimensions, but which can be accommodated in the indicated orientation on a pallet in a single layer (and which thus are too large to be accommodated in the side-by-side relationship of the cartons 17). Thus, it is to be understood that in manually stacking the reusable cartons to be processed by the system 10 of the invention, the operators need not perform any sorting or collating function and instead they simply need to place two smaller cartons (which may or may not be of the same size) in a common layer and in the described orientation, as illustrated for pallet 14' and generally positioned without any significant overlap of the edges of the carton beyond the edges of the pallet 14' (e.g., in accordance with a preferred embodiment of the invention, so as not to extend more than two inches beyond the edges of the pallet). These same constraints generally apply to the stacking of larger cartons 18 as well. Thus, to maintain stability, the cartons are stacked manually in at least a generally, vertically aligned fashion. As will be appreciated, the dashed line indications are fold lines embossed in the carton whereas the solid internal lines indicate cut lines defining flaps, which facilitate the erection and assembly of the carton in both initial use and, after recycling, in subsequent reuse.

Figure 2B:
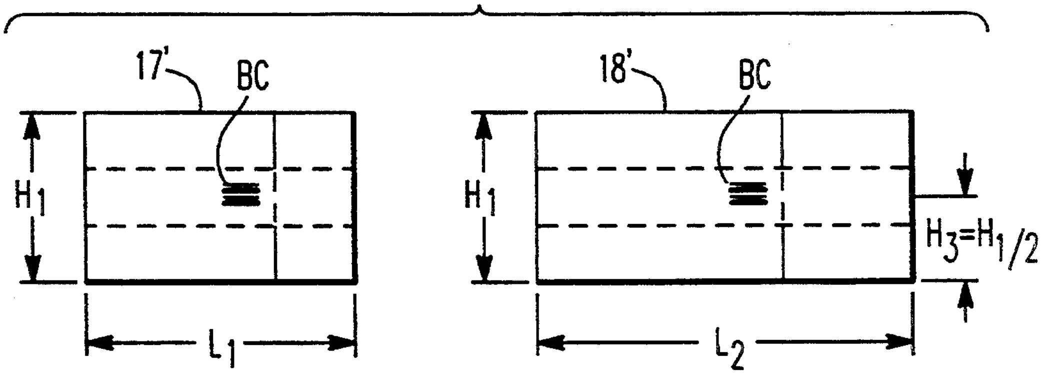

System 10 of the invention is adapted to accommodate a number of different types (and sizes) of cartons, as typically are employed by a given manufacturer and, depending upon the degree of carton standardization and other characteristics, may employ corresponding, different modules. FIG. 2B illustrates one typical form of standardization in which both smaller cartons 17' and larger cartons 18' have a common height H1 but differing lengths L1 and L2, respectively. Further, the cartons 17' and 18' both contain a bar code BC centrally located thereon (and thus extending symmetrically above and below a central longitudinal axis at a height position of $H3=H\frac{1}{2}$), the corresponding bar codes BC being present on both sides of the flattened cartons 17' and 18' with the spaced bars thereof oriented parallel to the longitudinal dimension of the flattened carton. The bar codes BC identify the type of the carton, including its dimensions, and may include further information, such as aging data.

Figure 2C:
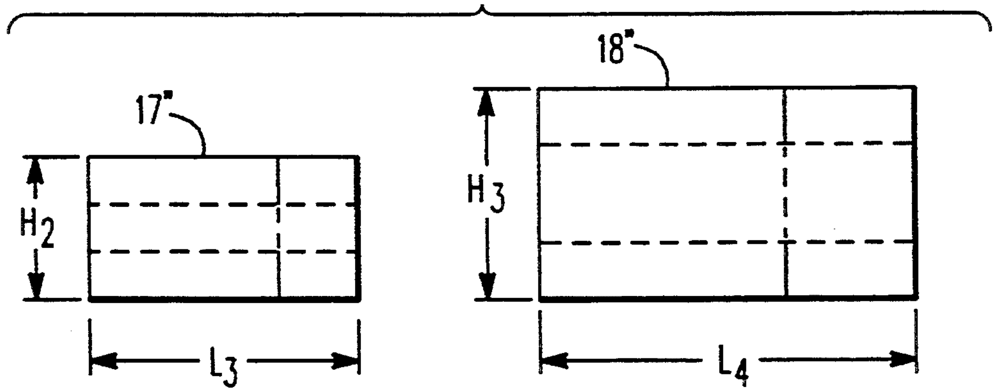

FIG. 2C illustrates two different, smaller and larger cartons 17'' and 18'' having respective heights H2 and H3 and respective lengths L3 and L4 wherein neither of the corresponding height and length dimensions are the same and, further, no bar code or other "readable" designation is present. Such cartons may also be processed by the system 10 of the invention in accordance with a more sophisticated identification module 50, as later discussed.

Figure 3:
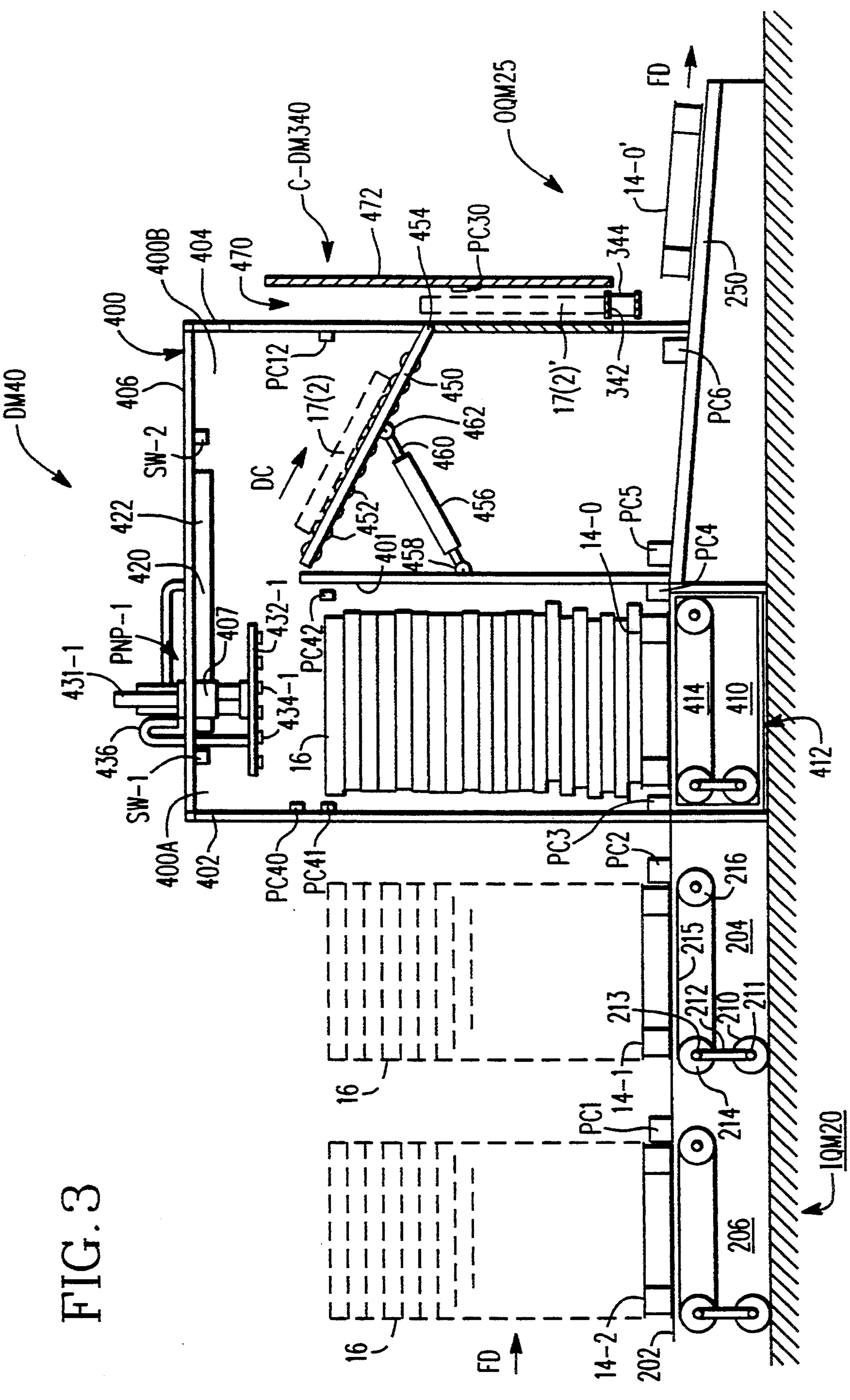
FIG. 3 is a side elevational view, on an enlarged scale, of the destacker module and of associated portions of the input and output queue modules.

With concurrent reference to FIGS. 1 and 3, IQM 20 defines an elongated transport bed 202 having an input end 200 and comprises pallet transport stages 204, 206, . . . , each of which is individually and selectively controllable to advance respective, successive pallets 14 into properly queued relationship. Each pallet transport stage 204, 206 may be identically constructed and, with reference to stage 204, includes a motor 210 connected through a pulley 211 and belt 212 to a pulley 213, and in turn to a drive roller 214. Conveyor belt 215 extends over idler pulley 216 and, when driven by drive pulley 214, serves to advance the pallet 14-1 engaged thereon in the feed direction FD. Each such stage may be a standard, commercially available zero-back pressure queuing conveyor and accordingly no further detailed discussion is required.

Typically, a forklift deposits a pallet 14 with the manually assembled stack 16 of multiple layers of cartons thereon onto the input end 200 of the IQM 20. Photosensors PC1, PC2 . . . detect the presence or absence of a pallet 14 at the corresponding positions. A signal rack IQM-RK 22 is electrically connected to each of the photosensors PC1, PC2 . . . and is connected to and serves as an electrical interface with the system controller 12.

Destacker module 40 has the primary function of removing the stack 16 of cartons in a time sequential, layer-by-layer manner for deposit into the modular conveyor 30, which then functions to transport the destacked, or removed, cartons from DM 40, in individual succession, through the successive modules in the transport path TR. DM 40 also interfaces with both IQM 20 and OQM 25, under control of SC 12, to assure the proper, time-sequential transport of the pallets 14 through the feed path FD. As will be explained, DM 40 also interfaces with, and functions as the carton input means to, the transport path TR.

Figure 4:
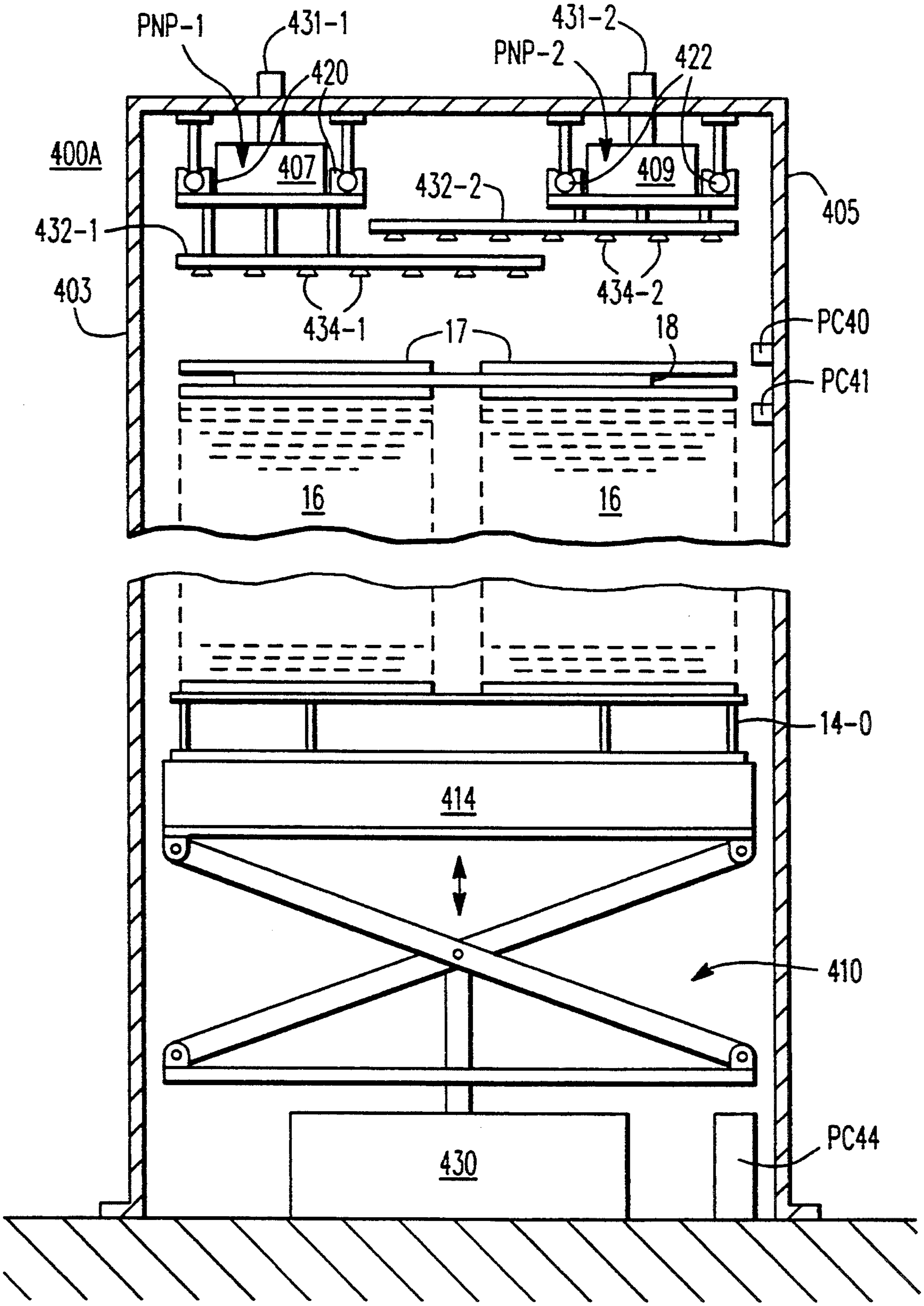
FIG. 4 is an output-end elevational view, partially in cross-section and thus in a plane along line 4—4 in FIG. 1, of the destacker module.

With concurrent reference to FIGS. 1, 3 and 4, DM 40 comprises a housing 400 having an input section 400A and an output section 400B separated by an interior vertical wall 401, front and rear walls 402 and 404 and side walls 403 and 405 (see FIG. 4), side wall 403 being removed in the view of FIG. 3.

In FIGS. 3 and 4, a transport and lift mechanism 410, having a housing 412, includes therewithin a motor driven transport stage 414, corresponding identically to one of the stages 204,206, etc. and effectively comprising a next successive stage thereof. Photosensors PC3 and PC5 are positioned approximately at the entrance to and the exit from the stage 410 and respectively detect in succession the leading edge of a pallet advanced into the DM 40, the sensor signal outputs of which are supplied to the DM rack 32. A pallet 14-0 is shown in position on stage 410 within DM 40, having been advanced there by coordinated, timed control of the transport stages 204 and 410 by SC 12. More particularly, upon confirming both the absence of any pallet on stage 410 (and thus within DM 40) by the output of photosensor PC4 and also the availability of a pallet at stage 204 by the sensor output from PC2, SC 12 activates stage 204 to advance the existing pallet 14 thereon (shown as pallet 14-1) through the input end 400A of DM 40 and, in time-coordinated fashion, activates transport stage 410 to continue the transport of pallet 14-1 ultimately to the received position of pallet 14-0 as shown in FIG. 3. The leading edge of the pallet being so advanced is detected by PC3 to confirm entry of the new pallet into DM 40 and subsequently is detected by photosensor PC4, confirming the proper location of the pallet 14-0 within input section 400A of DM 40; SC 12 responds thereto by terminating further driving of transport stage 410. Termination of driving may also be conditioned on the output signal from sensor PC3 indicating detection of the trailing edge of the newly-received pallet 14-0.

Successive pallets 14 as are available on the IQM 20 then are advanced so as to be successively next in position as pallets 14-1, 14-2, etc. shown in FIG. 3. The successive pallets may be advanced individually or simultaneously with the transport of the first available pallet 14-1 into the DM 40 (and thus to become the pallet 14-0) or the pallets may be individually transported to the next successive position in the queue. As will be apparent, the pallet transport speed is much slower than the subsequent transport of the individual cartons, as withdrawn from the top of the stack 16 within the DM 40, by the remaining modules of the system.

When the stack 16 of cartons has been completely removed from pallet 14-0, as later described, a destacking completion signal is transmitted to SC 12 which thereupon activates transport mechanism 414 to transport the now empty pallet 14-0 to OQM 25, the output of photosensor PC5, when detecting the leading edge of pallet 14-0, confirming the beginning of that transport. OQM 25 may be a gravity feed conveyor and accordingly pallet 14-0 is transferred by gravity down the conveyor surface 250 of OQM 25. To assure that no jam condition occurs, SC 12 responds to an output of sensor PC4 indicating detection of the trailing edge of pallet 14-0, to confirm that pallet 14-0 has fully exited from output 400B of DM 40 before activating transport stage 204 of IQM 20 to transport the next full pallet 14-1 into the input 400A of DM 40. Photosensors PC5 and PC6 monitor the successful transport of the empty pallet 14-0 through the output 400B of DM 40. By gravity feed, the exited pallet should continue down the conveyor surface 250 of OQM 25 in the direction FD, for example to the position indicated in FIG. 3 of the pallet 14-0'. In the event that output signals from either or both of PC5 and PC6 continue to indicate detection of a pallet —either due to a jam condition or because OQM 25 is filled to capacity with empty pallets and thus one remains within the output 400B of DM 40—SC 12 provides a corresponding alarm condition indication to operating personnel who then either manually or with a forklift remove one or more of the empty pallets 14 from the OQM 25, or correct any such jam condition which may exist. SC 12 however permits the system 10 to continue operating on the stack 16 of cartons on the pallet 14-0 which has been successfully positioned within the input 400A of DM 40.

DM 40 includes a pair of vacuum lift and transport devices PNP-1 and PNP-2, known commercially as "pick-n-place" devices, and which, as shown by the parallel and double-headed arrows associated therewith in FIG. 1, move in parallel paths aligned with feed axis FD. PNP-1 and PNP-2 are supported for rectilinear reciprocating movement on corresponding support channels 420 and 422 supported on the top wall 406 of housing 400 and are driven by hydraulic actuators 407 and 409, respectively, under control of SC 12. The pick-n-place units PNP-1 and PNP-2 are identical in construction and are known and commercially available. With reference to PNP-1, a vertical hydraulic drive 431-1 is controlled by SC 12 to raise and lower support plate 432-1 selectively between and to: (1) a lowermost vertical position, resiliently urged downwardly to slightly below the top surface of the top carton layer when at the lowermost position at PC41, for engaging the top carton layer of stack 16 in the input stage 400A, (2) an intermediate vertical position, as shown for PNP-1 in FIG. 4, and (3) an uppermost or fully retracted vertical position, as shown for PNP-2 in FIG. 4. Each support plate 432-1, 432-2 includes a plurality of suction cups 434-1, 434-2 which communicate through respective vacuum tubes 436 (see FIG. 3) to respective vacuum devices (not shown) which are controlled by SC 12 selectively to engage and grasp a layer of cartons and subsequently to release same, all in a manner to be explained.

Once a pallet 14-0 with a carton stack 16 thereon is in position, pick-n-place devices PNP-1 and PNP-2 are actuated so as to be operable in alternate succession, to perform a repeating sequence of operations: (1') initially, and at the fully extended and thus lowermost vertical position, to engage a top layer of cartons in the stack 16, the vacuum device (not shown) then being actuated to apply suction through the cups 434-1, 434-2 and thereby grasp the first layer of cartons; (2') the support plate 432-1, 432-2 then is raised with the grasped carton layer to the intermediate position (as shown for 432-1 in FIGS. 3 and 4); (3') support plate 432-1 then is actuated for forward rectilinear movement from the input stage 400A to the output stage 400B (see FIG. 3); and (4') when at the forward position, the vacuum device is deactuated and the carton is released. PNP-2, meanwhile, is actuated to raise the support plate 432 to the uppermost, fully retracted vertical position and thus with the support plate 432-2 vertically above support plate 432-1 thereby affording clearance therebetween, and then PNP-2 is retracted to the rest (initial) position within input stage 400A of DM 40. Position switches SW1 and SW2 are provided for each of PNP-1 and PNP-2 and respectively serve to sense and provide output signals indicating the fully retracted (initial) and fully advanced (forward) positions of the associated PNP device, those output signals being supplied through DM-RK 32 to SC 12. Upon receiving these corresponding position-indicating signals from SW1 and SW2, SC 12 then actuates the corresponding vertical pneumatic actuator and the respective vacuum devices to perform the previously discussed sequences of picking of a carton layer from the stack and transporting of same from the input stage 400A to the output stage 400B of DM 40 and, at the latter, for releasing same—and, further, the alternating reciprocating movement of PNP-1 and PNP-2 in these repetitive functions.

Photosensors PC40 and PC41 sense the top of the stack and provide outputs through DM-RK 22 to SC 12 which in turn controls the hydraulic lift 430 (FIG. 4) to raise the transport and lift stage 410 and thereby the pallet 14-0 and carton stack 16 thereon, thereby to maintain the top of the stack 16 within the height differential (e.g., 6 inches) defined between PC40 and PC41. A further photosensor PC42 (FIG. 3) detects the top of the pallet 14-0 and correspondingly provides a sensor output signal through DM-RK 42 to SC 12 to indicate that all carton layers of the stack 16 have been removed, whereupon SC 12 activates the hydraulic lift 410 to return the lift and transport stage 414 to the rest position (i.e., as in FIGS. 3 and 4). When that return is complete,.as detected by sensor PC44 (FIG. 4) and communicated through DM-RK 42 to SC 12, SC 12 then activates transport stage 414 to advance pallet 14-0 to the output stage 400B and thence to OQM 25 and to advance the next available pallet 14-1 into the input stage 400A of DM 40, and the operation repeats.

As best seen in FIG. 3, and taking into account the orientation of FIG. 1, the carton layer of the stack 16 which has been transported into the output stage 400B of DM 40 may constitute either two side-by-side, smaller cartons 17 or a single, larger carton 18 and which, when released from the corresponding device PNP-1 or PNP-2, fall onto a pivotal support shelf 450 which preferably comprises a roller conveyor having a plurality of rollers 452. The shelf 450 is normally at an inclined angle (i.e., the rest, or normal, position), as illustrated, and is mounted to the wall 404 by pivotal connection 454 and supported at a selectively controlled position by a pneumatic actuator 456 which is connected pivotally to the wall 401 at pivotal connection 458 and is pivotally connected through extendable arm 460 at pivotal connection 462 to the shelf 450. Sensor PC12 detects the presence of the carton layer on the shelf 450 and provides an output signal through DM-RK 42 to SC 12 which in response activates pneumatic piston 456 to extend the arm 460 and thereby pivot the shelf 450 from its rest position, as shown, to a vertical position whereupon the carton layer falls by gravity into a transport channel 470 of the conveyor submodule C-DM 340 associated with DM 40. In the conveyor submodule C-DM 340, an outer vertical wall 472, spaced from and parallel to the end wall 404 of DM 40 serves to define the channel 470; further, C-DM 340 includes a conveyor belt 342, supported on pulley 344, and on which the bottom edges of the vertically-oriented cartons 17(2)' come to rest. Photosensor PC30 detects the successful discharge of the cartons from the output 400B of DM 40 and correspondingly the entry of same into C-DM 340, for transport thereby out of DM 40 and along the transport path TR.

The carton layer may comprise two smaller cartons 17 (and thus shown in FIG. 3 and labelled "17(2)") oriented with the longer dimension 17L parallel to and thus inclined with the support shelf 450 in its rest position and thus inclined for discharge in the direction of arrow DC from the output section 400B and into the support channel 470. As will be explained, the panels 17 will require rotation through 90# for proper transport and subsequent processing. A larger carton 18, on the other hand, would be received in channel 470 with the height dimension or axis H extending vertically and thus would be properly oriented for edge transport by C-DM 40 of the conveyor module 30 and thus from C-DM 340 and through the transport path TR.

Figures 5A, 5B:
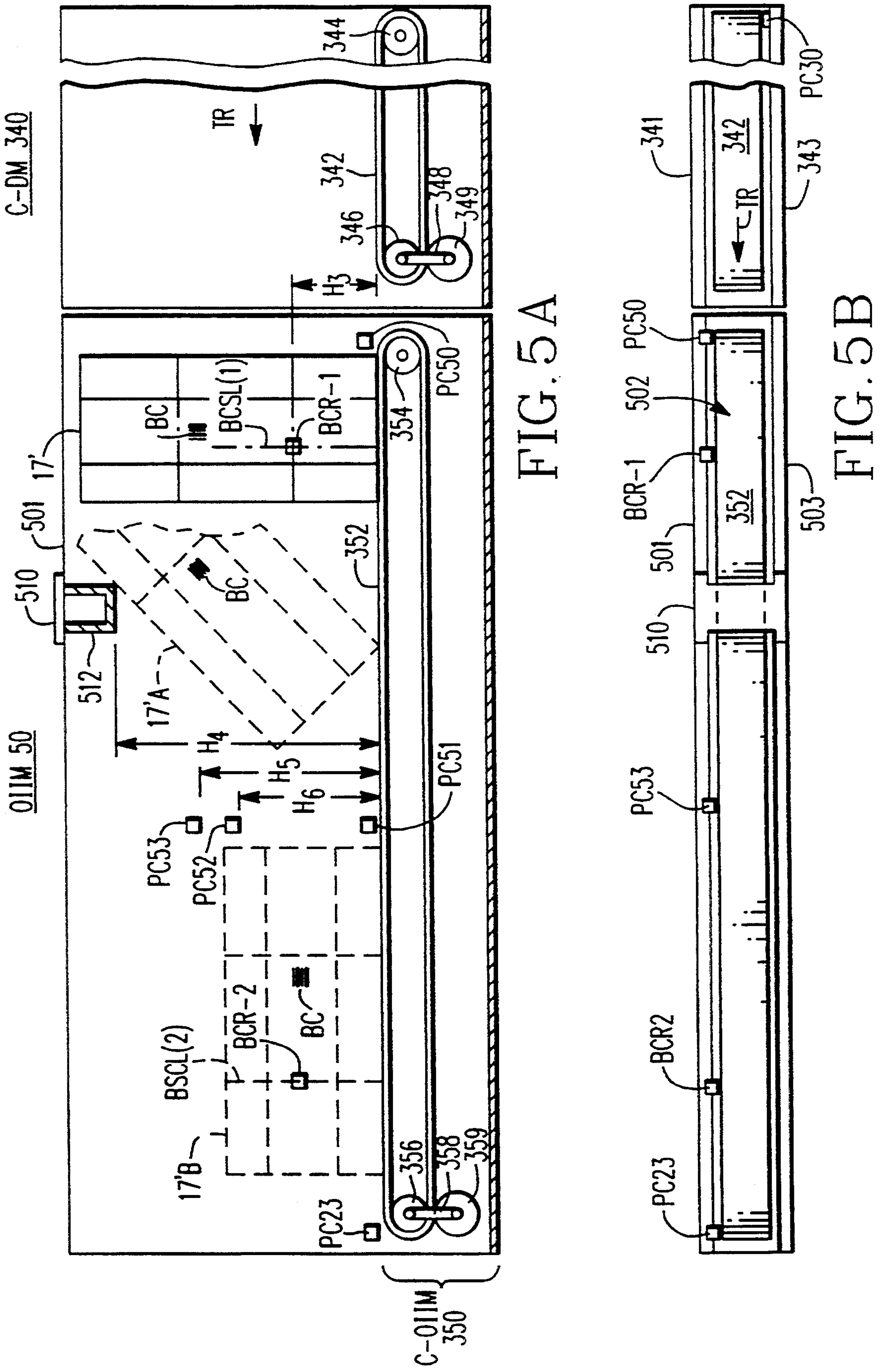
FIG. 5A is a side elevational view, partly in cross-section, taken in a plane extending along the long leg of the "T," of the orientation, identification and inspection module
FIG. 5B is a top plan view thereof.

The orientation, identification and inspection module 50 (OIIM) is shown in a first embodiment in FIGS. 5A and 5B, suitable for processing of the different type cartons 17' and 18' of FIG. 2A.

FIGS. 5A and 5B also show a fragmentary portion of C-DM 340, as interfaced with OIIM 50, and wherein the conveyor belt 342 extends from idler pulley 344 (also seen in FIG. 3) and about a driven pulley 346 connected through belt 348 to motor 349, and which edge-transfers cartons in a vertically oriented position. As before-noted, PC30 detects the entry of a carton into C-DM 340 and provides an output through DM-RK 32 to SC 12. Conveyor module C-OIIM 350 operates at a higher speed than the module C-DM 340 and correspondingly accelerates each carton, in succession, as received thereby to produce adequate spacing between successive cartons to permit performing subsequent operations thereon. It will be understood that the successive conveyor submodules C-SMI, II, . . . associated with the sorting modules I, II, . . . may operate at the same or higher speed as C-DM 340, for receiving and maintaining proper spacing between successive cartons being transported through those successive modules. As will be apparent, within the OIIM 50, and if desired, the associated conveyor may include separate submodule sections associated with the respective, different components thereof so as to successively accelerate a carton through the respective, successive sections, should it be desired to increase the spacing between successive cartons. C-DM 340 includes a pair of spaced and parallel vertical sidewalls 341 and 343 defining a transport channel therebetween and which is enclosed at the bottom by the upper surface of conveyor belt 342. In FIG. 5B, PC30 is also shown, the sensor signal from which confirms receipt of one (or more) cartons in C-DM 340 from DM 40 which is transmitted to SC 12. While C-OIIM 350 may be segmented, as before-noted, for ease of illustration, it is shown to include a single conveyor belt 352 which is carried by pulleys 354 and 356, the latter driven through belt 358 by motor 359, selectively under control of the SC 12. OIIM 50 includes a pair of parallel and spaced vertical sidewalls 501 and 503 defining a channel 502 therebetween. The associated conveyor submodule C-OIIM 350 accordingly is mounted to the sidewalls 501 and 503, the upper surface of conveyor belt 352 forming the bottom surface of channel 502. PC50 senses an incoming carton and produces an output signal transmitted through OIIM-RK 52 to SC 12 to confirm same.

FIG. 5A illustrates the condition of a smaller carton 17′ (FIG. 2B) received with its longer dimension (17L) vertically oriented and thus transverse to the transport path TR and accordingly requiring a 90# rotation. Bar code reader BCR1 is disposed so as to scan along the scan line BCSL(1) transverse to the bars of the BC and is positioned generally at the height H3 so as to scan symmetrically above and below and thus through the bar code BC, when the carton 17′ is properly oriented. From FIG. 2B, it will also be apparent that a properly oriented, larger carton 18′, since having the same height H1 and location H3 Of bar code BC thereon, will likewise be scanned by BCR1. Because of the initial, 90# disorientation of carton 17, BCR-1 will produce no output. It should be noted then because of the differing longitudinal dimensions L of cartons 17′ and 18′, the potential exists that an improperly oriented carton 17′ (or 18′) nevertheless could have the printed bar code BC thereon positioned at height H3 above the conveyor belt 352 and therefore in line with the bar code scan line BCSL(1). However, since the bars and spaces would now be parallel to BCSL(1), BC would not be read by the bar code reader BCR-1.

Whereas the absence of any bar code read output at the appropriate time sequence following the sensing of carton 17 by PC50 could be used by SC 12 as a control function to indicate the need for rotation of carton 17, for the standardized carton height H1 of the cartons 17′ and 18′ of FIG. 2A, a simpler rotation technique is available. Particularly, a rotator bar 510 is affixed to and extends across the top edges of sidewalls 501 and 503 and includes a downwardly depending portion 512 at a vertical distance or height H4 which is greater than the height dimension H1 of the cartons 17′, 18′ but less than the smallest length dimension L1, L2, . . . thereof. As a result, any carton 17′ (or larger carton 18′) which enters OIIM 50 with the longitudinal axis vertically oriented and thus transverse to the transport path TR, will abut the rotator bar extension 512, as shown for the carton 17′A indicated in phantom lines, causing the same to rotate in a clockwise direction through 90# and thereby assume the proper longitudinal edge, vertical transport orientation shown for the carton 17′B in phantom lines.

A pair of photosensors PC51 and PC52 are vertically aligned and spaced, respectively, just above the surface of conveyor belt 352 and at a height H6 less than the height H1 such that for the correctly oriented carton 17′B, both PC51 and PC52 sense the leading edge thereof at substantially the same time. A third photosensor PC53 is positioned at a height H6 greater the height H1 and affords a redundant check as to proper orientation of the carton 17′B, i.e., in the event that carton 17′B is not properly and fully oriented, a sensor output from PC53 will designate a jam condition. These outputs are supplied through the OIIM rack 52 to SC 12 to indicate a jam and therefore an alarm condition.

Assuming successful orientation of carton 17′B has occurred, as confirmed by simultaneous sensor outputs from PC51 and PC52, bar code reader BCR-2, aligned at the bar code scan line BCSL(2), will successfully read the bar code BC on carton 17′B as the latter is transported in the path TR, and the bar code sensed output is communicated through OIIM-RK 54 to SC 12.

SC 12 at this juncture recognizes the particular carton, based on the bar code output, and is assured that the carton is properly oriented for further transport through the successive sorting modules and for routing thereby into the appropriate stacker bin. As later discussed, an inspection of the carton may be automatically conducted by OIIM 50 to confirm that it is acceptable for reuse.

Figures 6A, 6B:
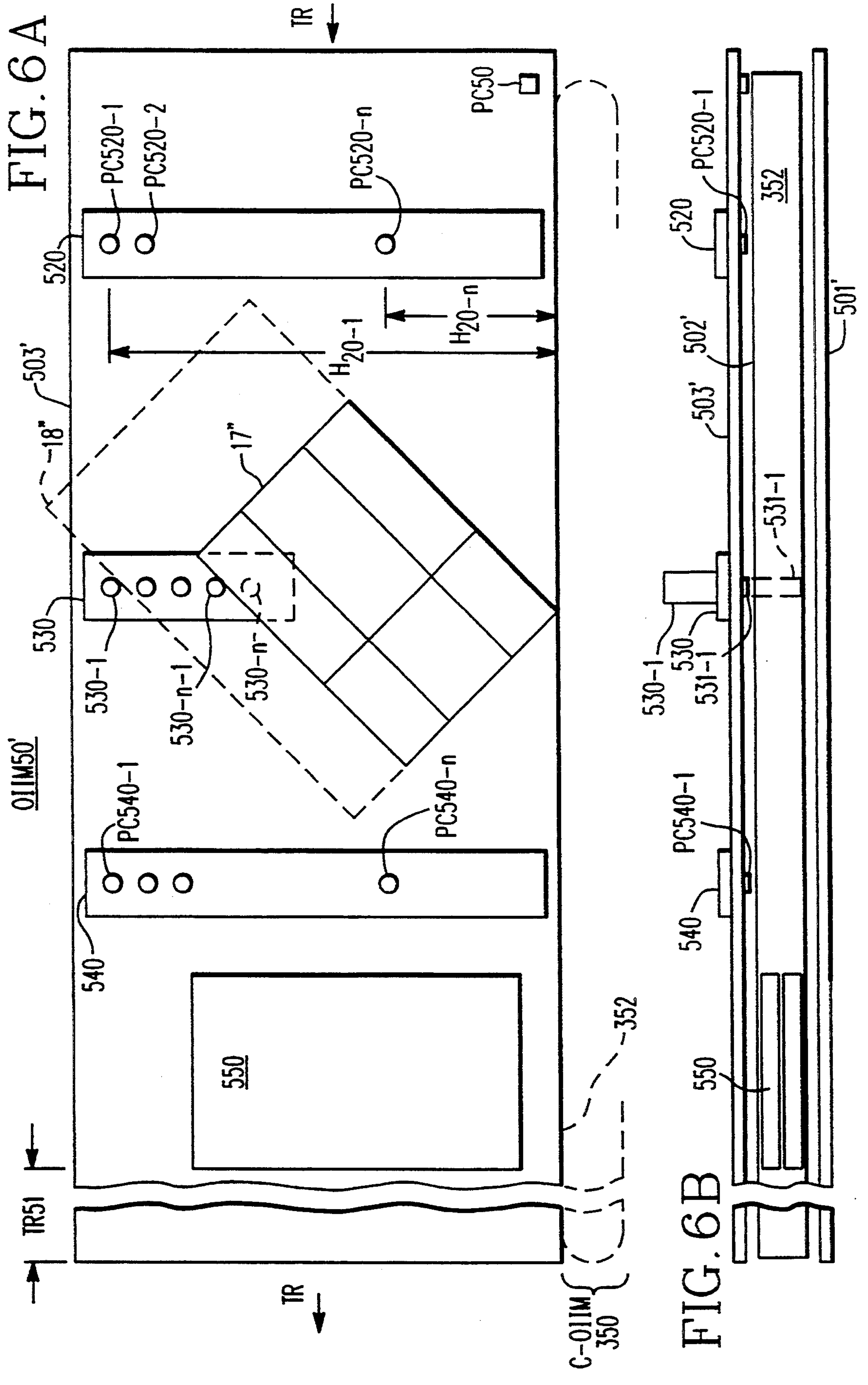
FIGS. 6A and 6B are views, respectively as in FIGS. 5A and 5B, of an alternative embodiment of the orientation, identification and inspection module.

FIGS. 6A and 6B are views, partly broken-away and schematic, corresponding to FIGS. 5A and 5B and illustrating an alternative embodiment of the orientation, identification and inspection module, designated OIIM 50′. The module 50′ is of more general applicability than the module 50 and for example can process cartons of the types 17″ and 18″ shown in FIG. 2C and which differ in both height and length dimensions. The dimensions, of course, are not random but rather, any given manufacturer will have a specified set of carton sizes. OIIM 50′ functions effectively to provide electrical measurement sensor signals through OIIM-RK 54 to SC 12 which in turn computes the dimensions of the carton being processed and then resolves whether the current carton orientation is proper or must be changed by 90# to effect the desired longitudinal vertical edge transport. OIIM 50′ can accommodate a wide range of different carton types with varying longitudinal (width) and height dimensions. For the circumstances in which carton orientation cannot be determined by the measured dimensions, e.g., when a carton is square, the bar code technique of OIIM 50 (FIG. 5A) may be employed.

In FIGS. 6A and 6B, PC50 detects and provides output sensor signals corresponding respectively to the leading edge and the trailing edge of a carton and, by the known rate of transport by the conveyor belt 52, SC 12 computes the dimension of the carton parallel to the transport path TR. Photosensor array 520 includes a plurality of vertically aligned and spaced photosensors 520-1, 520-2 . . . 520-n positioned at heights, i.e., vertical distances, ranging from H20-1 to H20-n above the surface of conveyor belt 352 in which H20-n is less than the smallest carton dimension H2 and H20-1 is greater than the largest carton dimension L4 (FIG. 2C). Depending upon which of the photocells PC520-1 through PC520-n are ON and which are OFF, the signal outputs of array 520 provide a height measurement indication (i.e., more precisely, a measurement of the vertical dimension of the carton sensed thereby). SC 12 accordingly, from the computed carton dimension parallel to the transport path TR and the electrically sensed and thereby recognized transverse (vertical) dimension of the same carton, recognizes the carton in question from the known dimensions of cartons which the system has been set up to process and thereby determines whether or not a 90# rotation is required. Selective rotator 530 includes a vertical array of hydraulically actuated rotators 530-1 through 530-n and which are spaced at heights above the conveyor belt 352 corresponding to just less than the diagonal dimension of each of the different types of cartons. As shown in FIG. 6B for actuator 530-1, the hydraulic conduit supplies pressure thereto for projecting the associated rotator rod 531-1 from a retracted, rest position to an actuated position (shown in dotted lines). Accordingly, for the relative dimensions of the cartons 17" and 18" in FIG. 6A, appropriate commands are transmitted from SC 12 to the array 530 to activate rotator actuator 530-n-1 for rotating carton 17" (and, selectively, rotator actuator 530-1 for rotating the larger carton 18" shown in phantom lines).

If desired, a second photosensor array 540 having a plurality of photosensors 540-1, . . . 540-n corresponding to those of the array 520, and positioned in path TR beyond the selective rotator 530, may be provided for sensing the resultant height dimension and, by timing, also the length dimension of the rotated carton thereby to provide sensor signals to SC 12 indicative of both the height (as directly sensed) and the length (as sensed in conjunction with leading edge/trailing edge detection and the known transport speed of conveyor belt 352) thereby to confirm the proper orientation of the carton.

OIIM 50' further illustrates an inspection submodule 550 which inspects the color, structural integrity, and other aspects of each identified carton to confirm that the same is acceptable for reuse. The array 540 also provides a timing output relative to transport of a carton into the inspection submodule 550, as later described. Transport path segment TR51, measured from the trailing edge of inspection device 550 to the output end of OIIM 50', is greater than the longest longitudinal dimension L4 of the largest carton 18" thereby to enable SC 12 to process the outputs of device 550 and determine acceptability of the carton being transported, prior to exiting of the carton from the OIIM 50'. The inspection module 550 as well may be incorporated in the OIIM 50 of FIGS. 5A and 5B, and is further detailed in and explained with reference to FIGS. 10A-10D, hereafter.

While the functional components of the OIIM have been shown to be disposed, relatively to the transport path TR, for first producing the proper carton orientation and then identifying same in the case of C-DM 340 of FIGS. 5A and 5B, it will be appreciated that in the case of OIIM 50' of FIGS. 6A and 6B, the carton effectively is first identified and then, if incorrectly oriented, is rotated to the proper orientation. Hence, it will be understood, in the broader context of this invention, that identification may precede orientation or orientation may precede identification.

As before-noted, the system 10 is modular in construction and thus may accommodate a plurality of sorting modules 60 of a desired number, illustrated in FIG. 1 as three and designated therein as sorting modules I, II and III, each having associated first and second pairs of stacker bins 66 which are predesignated by the operator for receiving, individually and respectively, a specific type of carton, out of the various types currently being sorted. As illustrated in FIG. 1, in SMI, each of the left and right stacker bins SB1L and SB1R is designated to receive large cartons 18, to be stacked as a single stack in each, whereas each of the second pair of left and right bins SB2L and SB2R is designated to receive two side-by-side, smaller cartons 17 in each layer and thus a dual stack. One bin, illustrated as the second lefthand bin 2L of the second sorting module SMII, is predesignated to receive rejects. Any number of bins may be selectively designated for any specific type of carton which the system is designed to handle, consistent with the carton specifications of a given manufacturer. Further, the number of bins predesignated for a given type of carton being sorted may be set in relation to the relative proportions of carton types in a given load currently being processed. Overflow/recycle bins may also be designated, for receiving one or more types of identified cartons for which the respective, designated stacking bins are full, thereby to avoid system shutdown, as later explained, and permit the continuation of processing operations while the corresponding, full pallets are removed and replaced with empty pallets in the affected such stacking bins. The overflow bins thus will have a random assortment of identified and acceptable cartons and at suitable intervals, the pallet on which they are stacked is removed and reintroduced in the IQM for recycling and sorting, etc. Thus, the system 10 of the invention is altogether flexible as to the carton selective, predesignations of bins by carton-type. Because the pallets are typically rectangular (i.e., not square) and thus have a greater longitudinal (width) dimension than height dimension, and as will be appreciated from FIG. 2A, smaller cartons 17 are positioned with their longitudinal dimensions parallel to each other and transverse to that of the pallet 14' whereas the larger cartons 18 are stacked with the longitudinal dimension thereof parallel to the longitudinal dimension of the pallet 14". Since both the smaller and larger cartons are transported longitudinally along the conveyor submodule and are routed into the stacker bin in a direction transverse to the longitudinal dimension of each and the direction of transport, the pallets in the stacker bin predesignated to received smaller cartons are positioned with the longitudinal dimension transverse to the direction of transport TR whereas the pallets for the larger cartons are positioned in the stacker bins predesignated therefore with the longitudinal pallet dimension parallel to the direction of transport TR.

Figure 7:
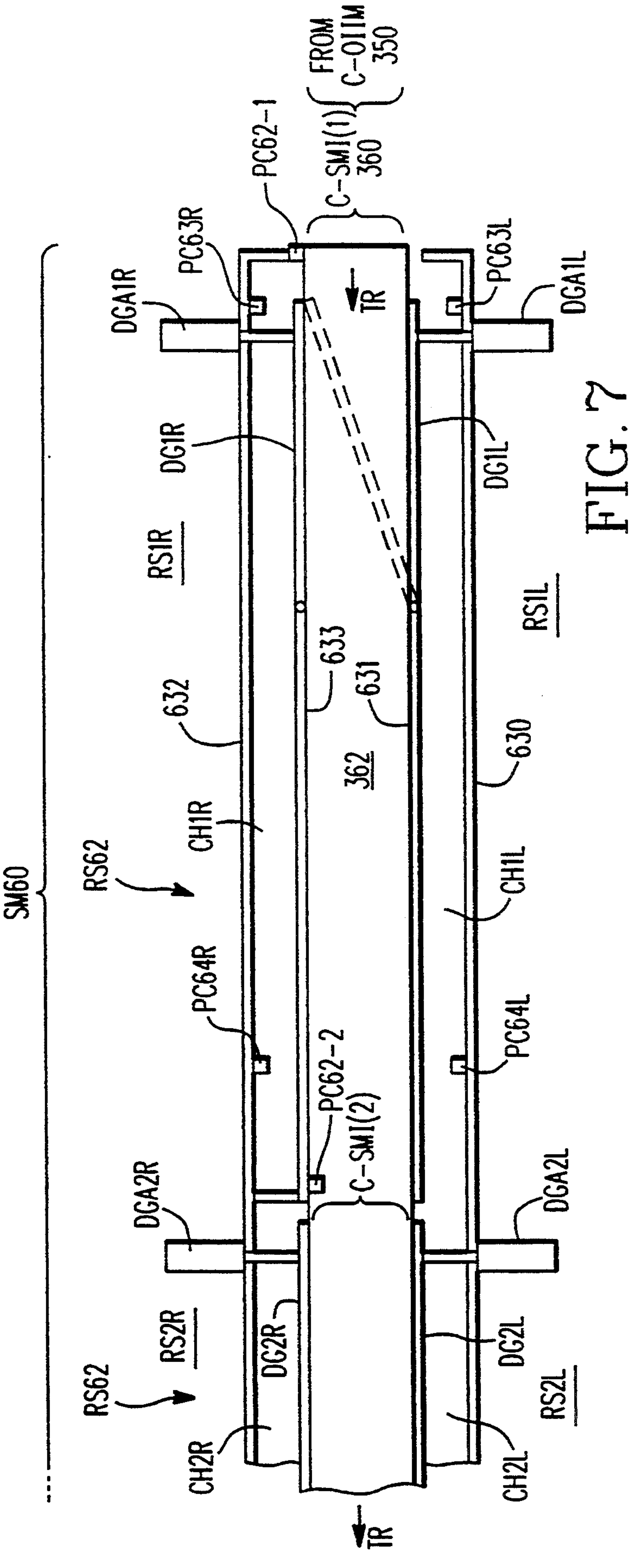
FIG. 7 is a top plan view of the routing submodule of sorting module I, illustrative of each such routing submodule.

With reference to FIGS. 1 and 7, each sorting module 60 includes a corresponding modular conveyor 360 illustrated as having first and second portions C-SMI(1) and (2) corresponding to the first and second pairs of routing submodules and stacker bins; as shown in FIG. 7, however, the conveyor submodule 360 for a given sorting module may comprise a single, continuous conveyor belt 362 mounted and driven in the same fashion as in the preceding modules 50 and 30. FIG. 7 illustrates the transport path TR of a carton exiting C-OIIM 350 and entering into the receiving end of C-SMI(1) 360. Photosensor PC62-1 at the input end of C-SMI(1) detects the leading edge of the carton and communicates same to SC 12. If the carton is not to be routed to either of the associated left and right stacker bins SB1L and SB1R, the carton continues transport in the direction TR and the leading edge is detected by the photocell PC2-2 at the input end of C-SMII(2) and a corresponding indication provided to SC 12. SC 12 thereby tracks the transport of each carton through each of the two stages, (1) and (2) of each of the sorting modules I, II and III.

Where the received carton is intended to be routed to a designated stacker bin of a given sorting module, and for example stacker bin SB1L of SMI, SC 12 actuates a deflection gate for the routing submodule associated with the designated stacker bin. More particularly, assuming an advancing carton is detected by sensor PC62-1 and is to be routed to the designated stacker SB1R (FIG. 1), the hydraulic deflection gate actuator DGA1L is actuated by SC 12 to move the associated deflection gate DG1L to the dotted line position, thereby intercepting the leading edge of the carton which, by continued movement of conveyor belt 362, is driven into the corresponding chute 1L (CH1L). Within CH1L, the leading edge of the carton is detected in sequence by photosensors PC63L and PC64L and the trailing edge is subsequently detected by sensor PC63L, the corresponding sensor signals being communicated to SC 12 which thereby confirms receipt of the carton in chute 1L and actuates DGA1L to close gate DG1L.

Figure 8:
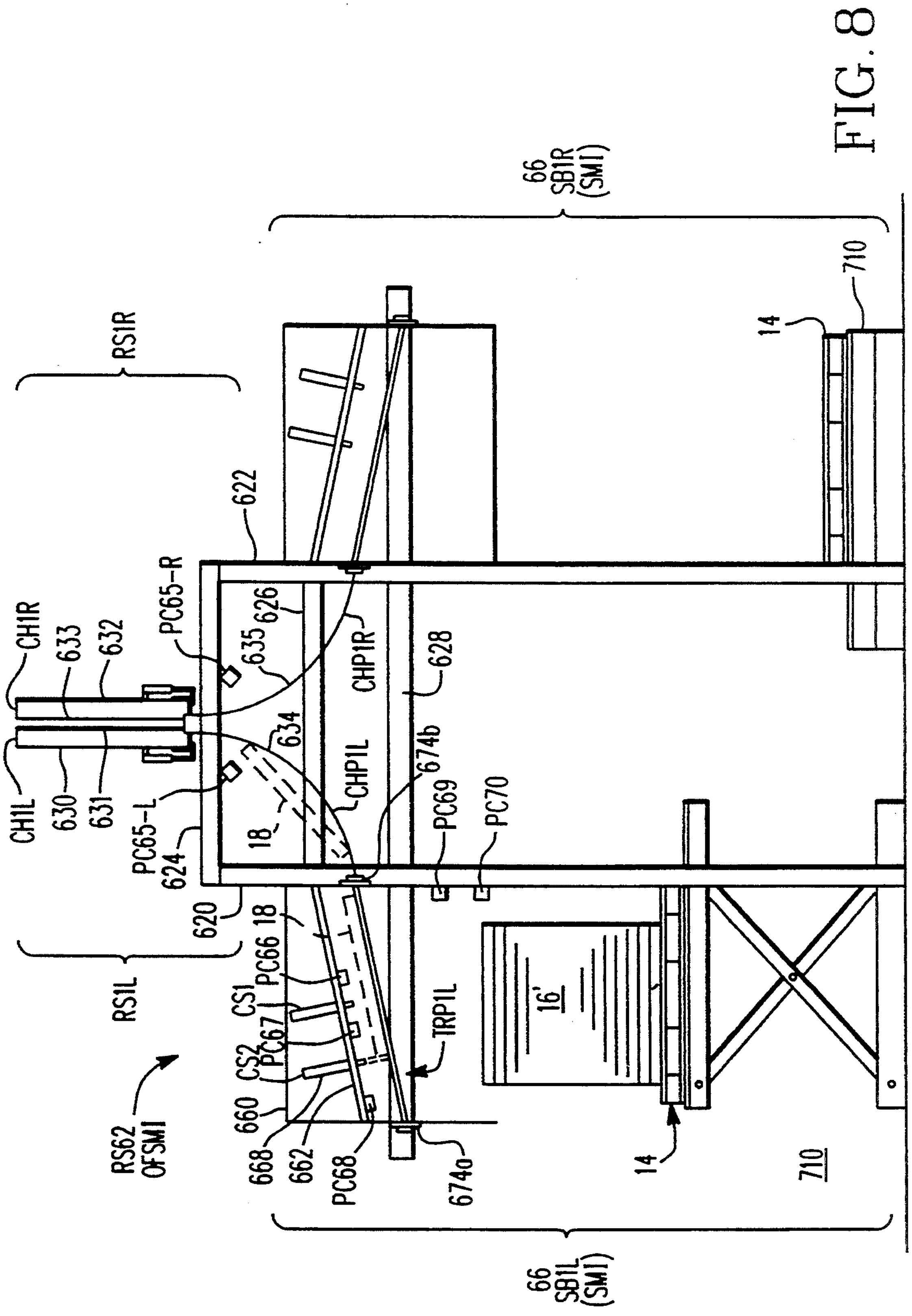
FIG. 8 is an end elevational view, in a plane along line 8—8 in FIG. 1, of sorting module I, illustrative of each of the plural sorting modules.

FIG. 8 is an end elevational view of the routing submodule 62 associated, for example, with the first sorting module 60 (SMI) and illustrates, more specifically, the first pair of left and right routing submodules RS1L and RS1R, the respective chutes CH1L and CH1R, the corresponding conveyor submodule C-SMI(1) and the respective first pair of left and right stacker bins SB1L and SB1R. Since the identified left and right components are identical except for orientation, the following detailed description is limited to the left submodule SB1L.

A carton deflected into chute CH1L is maintained therein by a chute trap door CHTD1L which is normally maintained in a closed (solid line) position by a trap door actuator CHTDA1L (a hydraulic piston) until the system controller (SC) 12 issues a command signal for activation of CHTDA1L whereupon the trap door CHTD1L opens and the illustrative carton 18 falls by gravity, travelling along a arcuate chute path CHP1L in the direction indicated by arrow CHA1L and enters the stacker bin SB1L. Photosensor PC65-L detects the passage of the carton 18 and provides an output through SMI-RK to SC 12 thereby to confirm the successful routing function.

Figure 9:
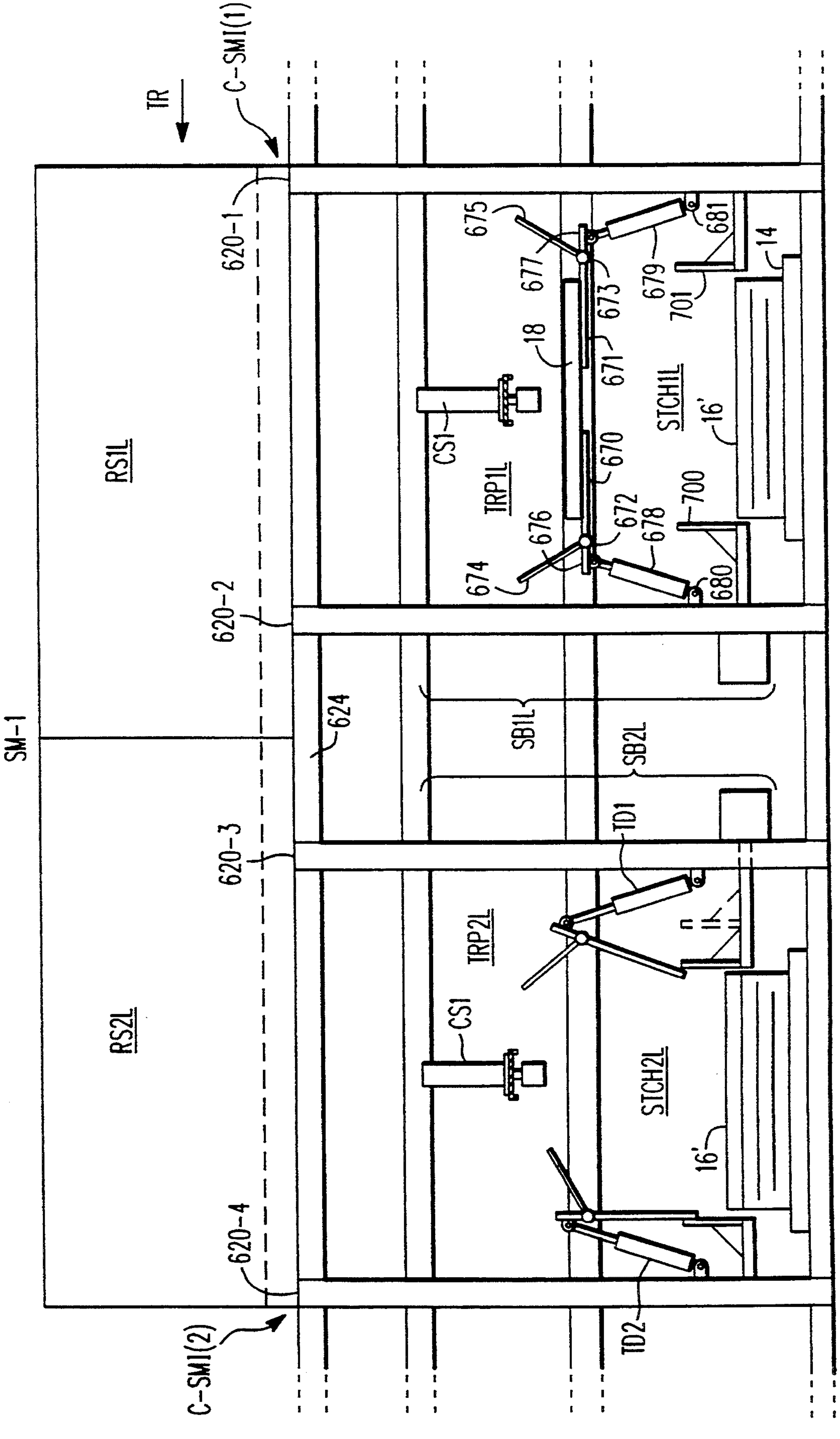
FIG. 9 is a front elevational view, taken in a plane along line 9—9 in FIG. 1, of the left-side stacker bins of sorting module I.

RS62 includes vertical frame members 620 and 622 and which are representative of a series of spaced vertical supports 620-1 through 620-4 as seen in the side elevational view of sorting module I in FIG. 9. A horizontal top support 624 is supported on these vertical supports 620 and 622 for interconnecting same and also for supporting the routing submodule RS62 and the conveyor submodule C-SMI(1) and (2). Lateral support bars 626 and 628 interconnect the upright supports 620 and 622, the lower bar 628 extending outwardly of the vertical supports 620 and 622 for supporting the left and right stacker bins SB1L and SB1R, respectively.

The chutes CH1L and CH1R are defined by parallel and spaced, vertical metal sheets 630, 631 and 632, 633, respectively and the same are suitably secured to and supported on the top support plate 624. The arcuate, gravity-feed transport paths CHP1L and CHP1R extend through suitable openings in the top support 624 and are defined by corresponding metal sheets 634 and 635. All of the metal sheets 630–635 preferably are of stainless steel and, particularly as to sheets 634 and 635, preferably are coated with a low friction material, e.g., high density polyethylene (HDPE), to facilitate transport of cartons along their surfaces. Alternatively, all of sheets 630–635 may be made entirely of molded HDPE.

FIG. 8 illustrates the first pair of left and right stacker bins SB1L and SB1R and FIG. 9, the left stacker bins SB1L and SB2L of the first and second pairs; further, it will be apparent that the referenced stacker bins are closely integrated structurally and functionally with the respectively corresponding routing submodules, particularly as shown in FIG. 8 for the associated routing submodule RS1L and stacker bin SB1L. For ease of illustration, certain components of the stacker bin submodule 66 are omitted in FIG. 9. More particularly, SB1L as seen in FIG. 8, includes a housing 660 which supports therewithin a slanted support plate 662 on which are mounted pneumatic pistons 664 and 668, the latter respectively functioning as carton stops (CS1 and CS2) to be explained.

A trap door mechanism TRP1L of SB1L is schematically illustrated in FIG. 8 and is shown in more detail in FIG. 9, along with the trap door mechanism TRP2L of SB2L. In FIG. 9, support plate 662 is omitted and only the carton stops CS1 are shown, for ease of illustration. Since identical, reference is had only to trap door mechanism TRP1L and which, as seen in FIG. 9, comprises a pair of shelves 670 and 671 mounted on respective rotatable support rods 672 and 673 and to which upright support fingers 674 and 675 are likewise mounted in fixed angular relationship to the shelves 670 and 671 and for common rotation therewith. Lever arms 676 and 677, effectively extensions of the shelves 670 and 671, respectively, are connected to hydraulic pistons 678 and 679, respectively, the latter being connected by respective pivotal mounts 680 and 681 to the vertical supports 620-2 and 620-1, respectively. Shaft 674 is supported at its opposite ends by bearings **674*a* and 674*b* to the respective, opposite vertical sidewalls of the housing 660**.

Adjustable guides 700 and 701 are mounted to the respective upright supports 620-2 and 620-1 and define a stacking channel (STCH1L) therebetween. Before system start-up and in conjunction with designating the type of carton to be received in each stacker bin 66 at the system controller 12, the guides 700 and 701 of the bins are adjusted so as to define the appropriate size of the stacking channels (STCH) thereby to accommodate the passage therethrough of the type of carton for which the associated bin is predesignated, thereby to maintain horizontal registry and vertical alignment of the corresponding stacks 16'. In operation and under control of SC 12, pneumatic actuators 678 and 679, when actuated, rotate the shelves 670 and 671 in respective clockwise and counterclockwise directions from the solid line positions indicated and through a 90# arc so as to be vertically oriented, essentially abutting against the respective guides 700 and 701.

A hydraulic lift mechanism 710, which may correspond substantially to the hydraulic lift 410 of DM 40 (see FIGS. 3 and 4), supports a pallet 14 for receiving the sorted stack of cartons, at each of the stacker bins 66; in FIG. 8, lift 710 is indicated in a raised position for SB1L and in a fully retracted, lowermost position for SB1R. A sorted stack 16' of (large) cartons 18, as designated for stacker bin SB1L, is illustrated in FIG. 8.

In operation, a carton 18, as transported through chute CHP1L, is received on the support leaves 670, 671 of the trap door mechanism TRP1L. Because only a single, large carton 18 is to be placed in each layer of the sorted stack 16', neither carton stop CS1 or CS2 is actuated, and the carton 18' comes to rest with the leading (longitudinal) edge against the outside wall of housing 666 at the dotted line position indicated in FIG. 8. Photocell PC68 detects the leading edge of the carton 18 and provides a suitable output through SMI-RK to SC 12 to indicate the appropriate positioning of the carton on the rotatable leaves 670 and 671, and in response to which SC 12 issues actuation commands to actuate pneumatic pistons 678 and 679 (FIG. 9) for rotating the leaves 670 and 671 of the trap door mechanism TRP1L, thereby opening the stacking channel STCH1L and permitting the carton 18 to drop through the stacking channel STCH1L onto the sorted stack 16'.

For a stacker bin 66 in which two smaller cartons 17 are to be received, such as SB2L of SMI, the carton stops CS1 and CS2 are both employed, CS1 in the case of positioning a second of the two side-by-side smaller cartons of a given layer and, alternatively, CS2 in the case of positioning a single smaller carton as a tie carton layer. In the case of a two, small-carton layer, the first carton 17 travels through chute CHP1L and is received at the lowermost end of trap door mechanism TRP1L. The leading edge of the first carton 17 is detected in sequence by PC66, PC67 and PC68, the latter particularly designating the proper, received position of the first carton 18 through SMI-RK to the SC 12. SC 12 then activates the first carton stop CS1 to extend its plunger; upon a second carton 17 being received, the latter is stopped with its leading edge engaged against the plunger of CS1 and the same is detected by PC66 which provides a sensor output through SMI-RK to SC 12. SC 12, in response thereto, and thus upon receiving confirmation that two cartons 18 are now present on TRP2L in the side-by-side relationship, then activates TRP2L for rotating the support shelves 670 and 671 and thereupon permitting the smaller cartons 17 to drop simultaneously and side-by-side through the stacking channel STCH2L onto the top of the sorted stack 16'.

In addition to tracking the progress of each carton through the system, SC 12 maintains a count of the number of layers of cartons being accumulated in the stacks of the respective bins. That count is used additionally in the case of stacking smaller cartons in side-by-side relationship in each layer so as to insert a "tie carton" on a periodic, regular basis. For example, and typically, such a tie carton is introduced for every twenty-five layers. With reference to FIG. 8 and assuming that the sorted stack 16 shown therein was of two side-by-side smaller cartons 17 rather than the single large carton per layer of the prior discussion, when twenty-five layers of cartons 17 have been accumulated in the stack, SC 12 activates CS2 such that the next carton 17 is retained in a mid-position on the trap door assembly, as detected by PC67 and response to which SC 12 actuates TRP1L to open the stacking channel. The tie carton then drops onto a mid-position on the stack, overlapping the side-by-side smaller cartons of the prior, top layer, as detected by PC69. Stop SC2 then is retracted and the previous stacking operation for the smaller cartons resumes and continues until a next "tie carton" is to be placed in the stack.

Figure 10A:
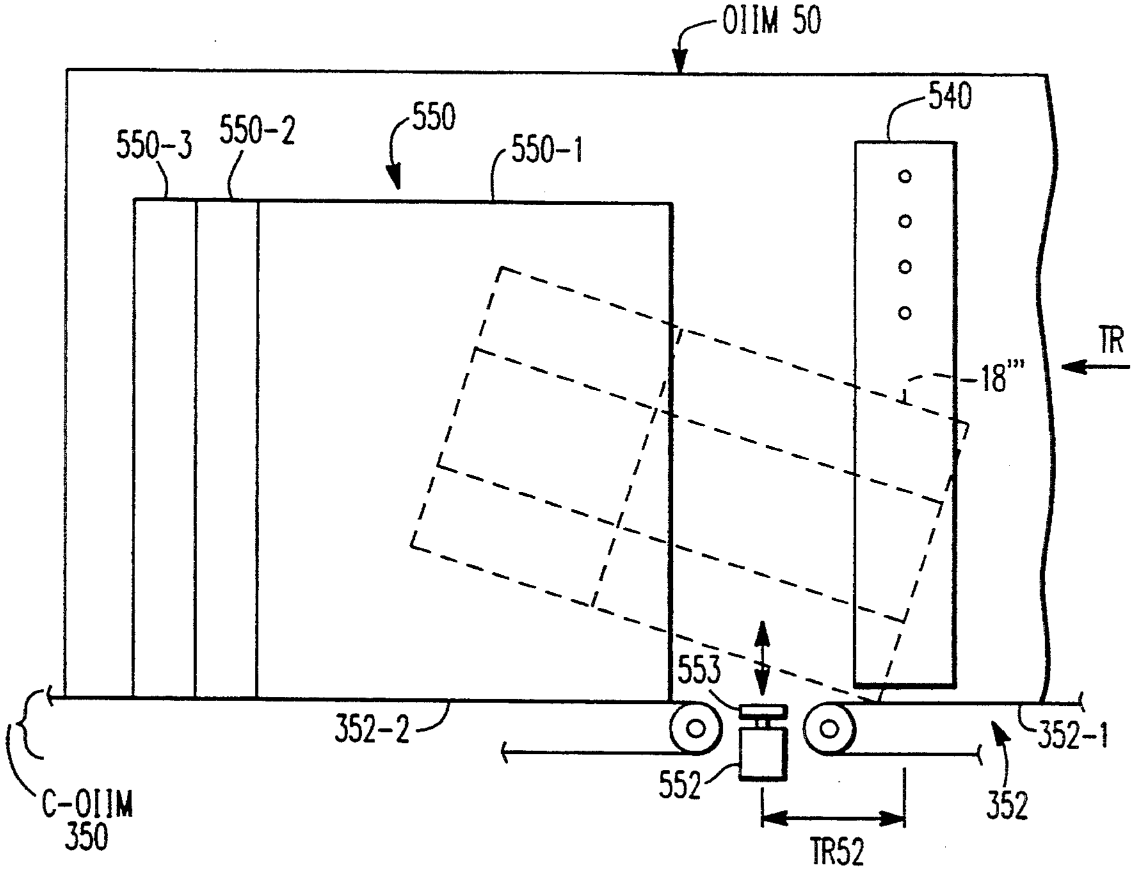
FIG. 10A is a simplified and schematic front elevational view of the orientation, identification and inspection module of FIGS. 6A and 6B more particularly illustrating the inspection submodule thereof.

In FIGS. 10A–10D, the inspection submodule 550 of the OIIM 50 is illustrated in greater detail, elements identical to those of FIGS. 6A and 6B being shown by identical numerals. As shown in FIG. 10A, the inspection submodule 550 includes plural components including a tactile sensor component 550-1, a moisture sensor component 550-2 and a discoloration sensor component 550-3, each thereof further including a continuous specialized transport system discussed in connection with FIGS. 10B–10D. As discussed in relation to FIGS. 6A and 6B, a carton 18", once rotated to the proper longitudinal orientation for vertical edge transport, is detected at its leading edge by a photocell array 540. In FIG. 10A, the conveyor belt 352 of the conveyor submodule C-OIIM 350 comprises segmented conveyor belt portions 352-1 and 352-2 which define a space therebetween and thereby accommodate mounting of a hydraulic actuator 552, disposed at a known distance TR 52 from the photosensors of the array 540. The leading edge of a carton 18''' is detected by the photocells of array 540 and the resultant detection output signal is supplied to SC 12 which, after a time delay corresponding to travel of the leading edge of the carton 18''' beyond the actuator 552, activates the latter to drive plunger 553 upwardly and raise the leading edge of carton 18''' to an angular position for transport through the inspection submodule 550 in the inclined orientation illustrated in FIG. 10A.

Figure 10B:
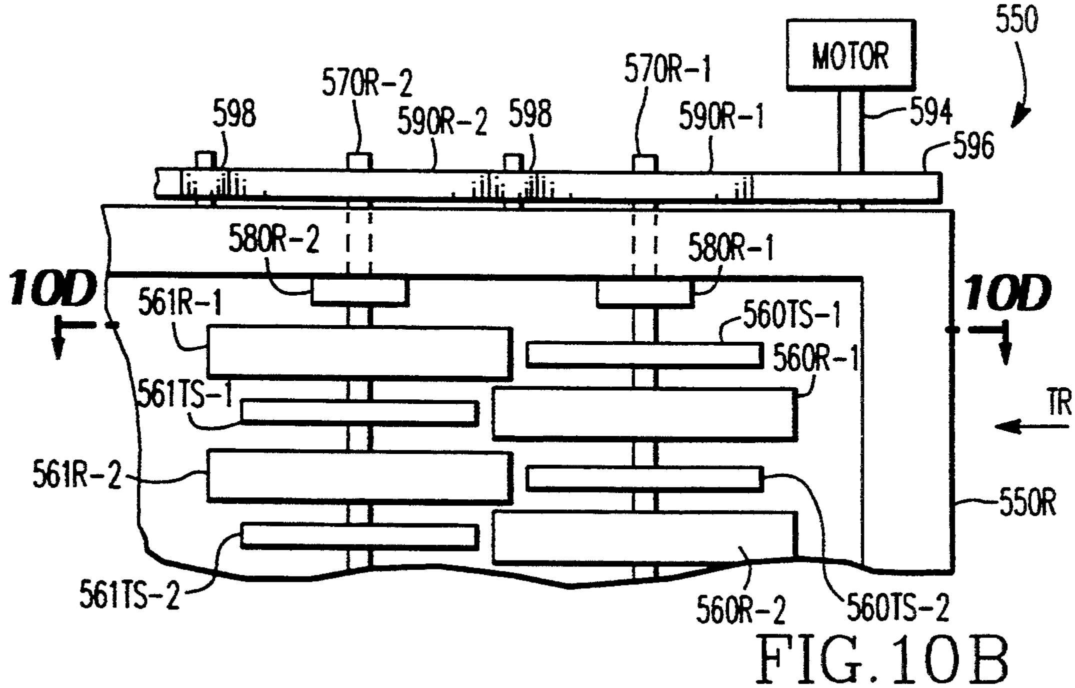
FIG. 10B is an enlarged fragmentary section of the inspection submodule of FIG. 10A.
Figure 10C:
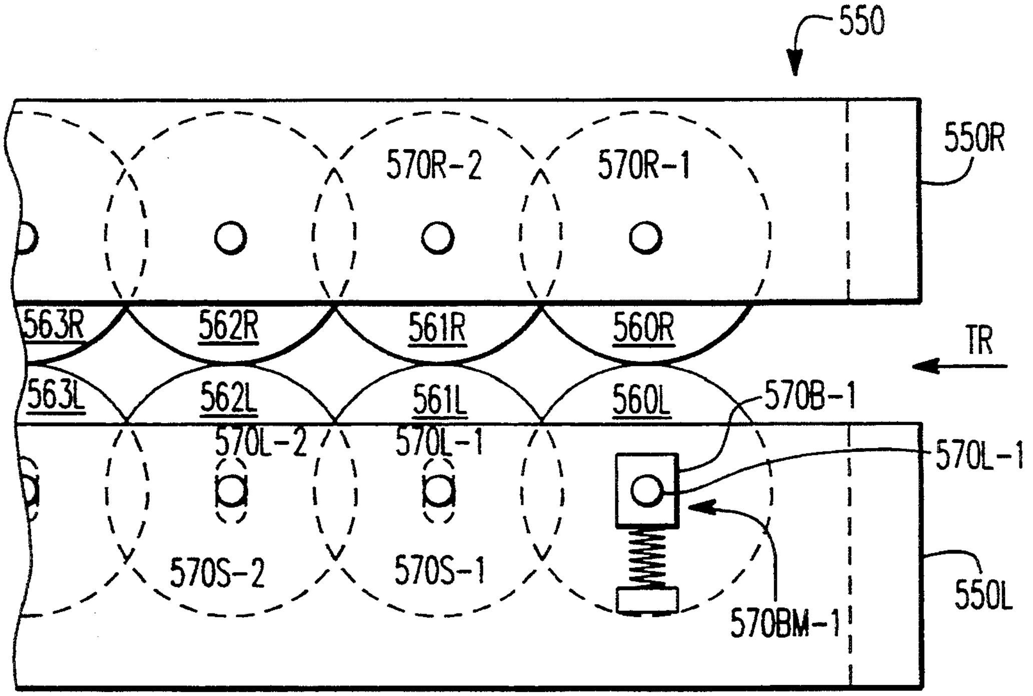
FIG. 10C is an enlarged and fragmentary section of a top planar view of the inspection submodule of FIG. 10A.

With concurrent reference to FIGS. 10B and 10C, the specialized transport mechanism of the inspection submodule 550 comprises means for engaging the carton and transporting same therethrough in the inclined transport orientation shown in FIG. 10A. More particularly, the submodule 550 includes, relative to the transport path TR, a left housing 550L and a right housing 550R including alternate, staggered sets of caster-type drive rollers 560R, 561R . . . and pinch rollers 560L, 561L . . . , respectively, arranged in opposed pairs to function as a multiple pinch roller drive assemblage. As shown in FIG. 10C, the rollers 560R-1, 560R-2, . . . of the first set 560R are arranged in alternate and staggered relationship with respect to the rollers 561R-1, 561R-2, . . . of the second set 561R, and the successive sets of rollers are mounted on corresponding shafts 570R-1, 570R-2, . . . , which in turn are rotatably supported in respective bearings 580R-1, 580R-2, . . . and thereby mounted to the housing 550R. Drive gears 590R-1, 590R-2, . . . are secured on the free ends of the shafts 570R-1, 570R-2, .... Motor 592, through shaft 594, drives gear 596 which engages and, in turn and through intermediate gears 598, rotates the drive gears 590R-1, 590R-2, . . . at a common, fixed speed and direction of rotation. At shown in FIG. 10C, the shafts 570L-1, 570L-2, . . . pass through elongated slots 570S-1, 570S-2, . . . in housing 550L and, as shown for shaft 570L-1, the free end of each is received in a respective bearing 570B-1 which is resiliently urged by biasing mechanism 570BM-1 in a direction transverse of the transport path TR and toward the right housing 550R, thereby to resiliently and independently bias the corresponding set of rollers 560L against the mating set of drive rollers 560R.

Figure 10D:
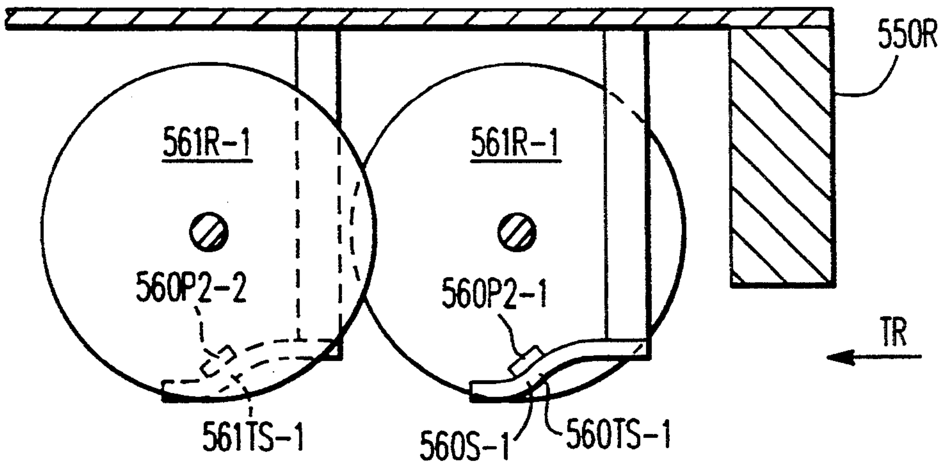
FIG. 10D is an enlarged fragmentary section of a portion of FIG. 10C illustrating internal details of the inspection module.

With concurrent reference to FIGS. 10B and 10D, tactile sensors are mounted in interspersed relationship in the intervening axial space defined relative to the rollers in each of the left and right housings 550R and 550L and are shown illustratively in FIG. 10B at 560TS-1, 560TS-2, . . . and 561TS-1, 561TS-2 for the roller sets 560R and 560R-1. As illustrated in FIG. 10D, corresponding mounting brackets are provided for the tactile sensors, as shown by brackets 560BR-1 and 560BR-2 for the tactile sensors 560TS-1 and 561BR-1, respectively.

With reference to tactile sensor 560TS-1, each thereof comprises a flexible, or spring, arm 560S-1 which carries thereon a respective piezoelectric device 560PZ-1 and defines a corresponding horizontal scan line, relative to each carton 18''' as it is transported through the submodule 550 in the inclined orientation, shown in FIG. 10A. The spring arms, such as 560TS-1, project inwardly into the path of travel of the carton 18''' and thus effectively sweep the surface thereof along respectively corresponding tactile scan paths. Defects in the surface structure of the carton (e.g., due to holes, tears, creases, etc.) cause corresponding deflections of the tactile sensor spring arms, such as 560TS-1, resulting in tactile scan, electrical signal outputs from the respectively associated piezoelectric devices, such as 560PZ-1, which outputs are transmitted to the central controller SC 12. SC 12 processes the tactile scan sensor outputs and derives therefrom, through a training, or learning, processing algorithm based on scanning numerous such acceptable cartons, composite tactile scan criteria data defining acceptable cartons, which data is stored in a memory. More specifically, each of the tactile scan sensors will produce a pulse as it engages and traces along the surface of the carton detecting, e.g., not only the leading and trailing edges but also normal creases and crevices or cuts in the carton such as are preformed to enable folding and erection of the carton for normal use. These "desirable" features correspond to certain characteristic numbers of pulses for the assemblage of scan sensors, for each identified carton and correspondingly for all such identified cartons intended to be processed by a given system. The acceptable carton signal criteria thus are established for the respective, different identified cartons as a learned function. Cartons which are unacceptable on the other hand will have, in some cases, fewer than the characteristic number of pulses of the established criteria for the identified carton type and, in other instances, and more typically, a greater number of pulses than that of the criteria, corresponding to "undesirable" features such as tears, cuts, holes, etc. In either instance, the processor SC 12 compares the sensed pulses for each carton with the characteristic number of pulses for the stored criteria for the identified carton type, in determining whether a carton is acceptable for reuse. Subsequent cartons, as identified, then are inspected and an evaluation made by the SC 12 as to acceptability for reuse, subject to the learned, acceptable signal criteria for the identified type of carton.

The moisture (humidity) sensor component 550-2 contains moisture sensing devices of a known type which as well provide outputs to SC 12 and which are compared therein with preestablished acceptance standards, as to carton moisture content, again for determining whether to process a given, identified carton for reuse or to reject same. Visual (e.g., discoloration) sensor component 550-3 likewise functions to detect visual characteristics of the surface of the carton, such as stains or excessive markings. Again, in known fashion, the visual sensor outputs are subjected to a learning process, of the same type as the tactile sensor outputs, to develop acceptance criteria for each different carton type and, again, for purposes of enabling the determination by SC 12 of whether the identified and inspected carton is acceptable for reuse or is to be rejected.

As will now be apparent, the inclined orientation of each carton during transport through the inspection submodule 550 permits an examination effectively of the entirety of both opposite surfaces of the flattened carton by the interspersed, or interdigitized sensor means and pinch roll driver transport means. The inclined angle of transport affords multiple, parallel scan paths across the surface of the inclined carton which are diagonally oriented relative to the longitudinal dimension of the carton and this is more effective for detecting creases, which tend to extend parallel to the longitudinal edges of the carton.

Figure 11:
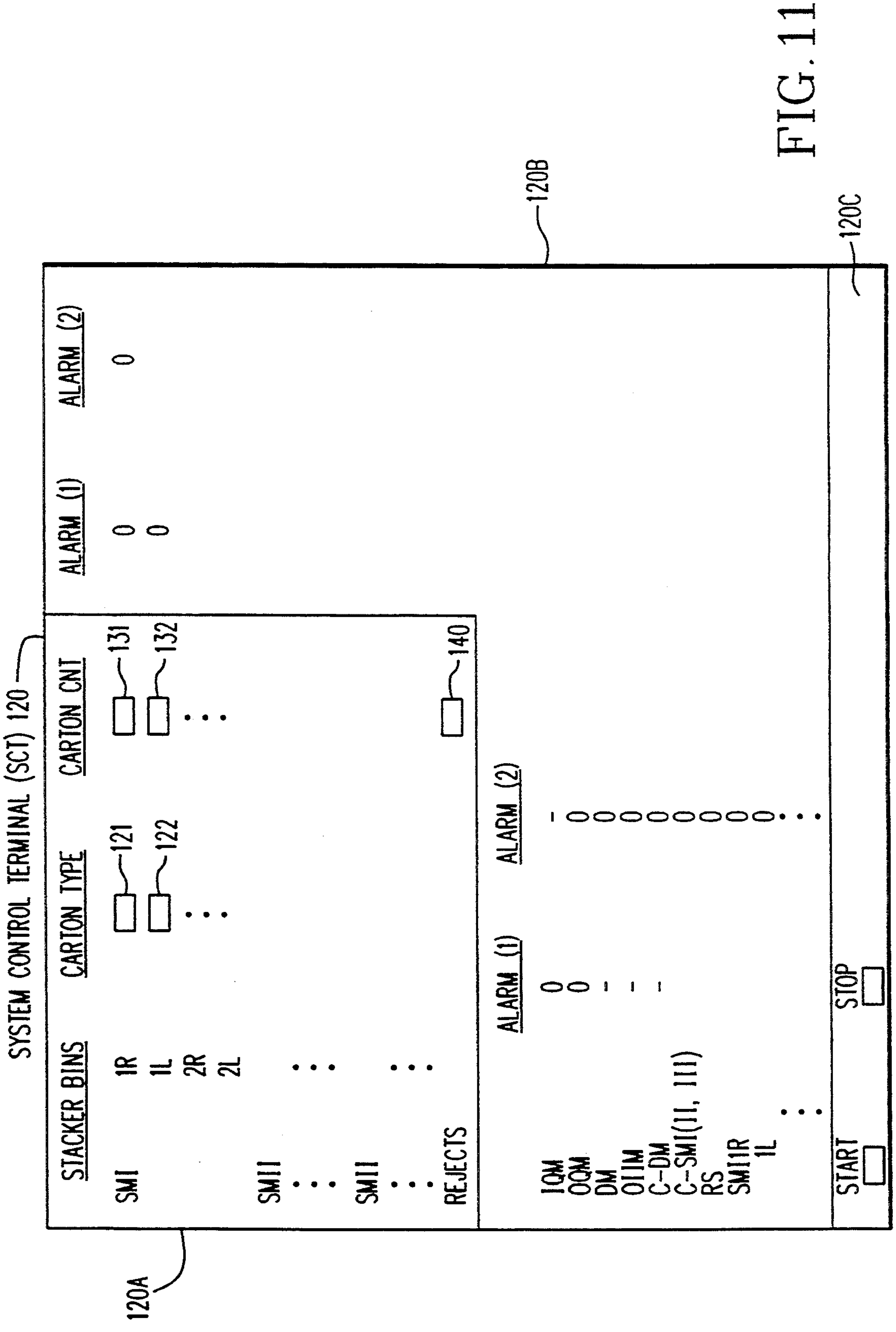
FIG. 11 is a schematic illustration of the control system panel.

The system controller 12 preferably is implemented in a programmable logic controller ("PLC") which is programmed to perform the requisite logic functions for producing the controls as above-discussed and as further explained in conjunction with the flowchart of FIGS. 12A–12G, and includes a system control terminal (SCT) 120 having a keyboard for enabling operator control inputs and a display in which, in conventional fashion for such equipment, includes a series of screens, e.g., a screen 1 indicating the carton identifications relative to the predesignated stacking bins in which they are respectively to be received, a screen 2 indicating current operating status of the various system modules and the components thereof, a screen 3 providing a display of alarm messages, and the like. The function of SCT 120 and corresponding displays are shown in a functional and schematic form in FIG. 11, for convenience of illustration. SCT 120 includes, as principle components, a stacker bin (SB) selective designation and display portion 120A, an alarm condition display 120B and a master control portion 120C. In portion 120A, as part of the initialization of the system prior to operation, carton types to be sorted are designated for each stacker bin (SB) of each stacker module (SMI, SMII, . . . ) by the corresponding carton type selectors 121, 122, . . . (The selectors 121, 122 of course are implemented as coded key inputs in the keyboard of the terminal, as an example of the correlation between the illustration of FIG. 11 and the use of a terminal with keyboard and display in an actual implementation of the present invention.) One or more of the carton type selectors may also be set to designate the corresponding one or more of the stacker bins as overflow bins. For convenience, the accumulating carton layer count in each stacker bin is displayed at 131, 132, . . . and the number of carton rejects at 140. The carton count displays are reset upon the pallet in the corresponding bin becoming full and being replaced with an empty pallet.

Portion 120B includes an identification of the various modules, as shown, and an alarm (1) display condition for the modules IQM, OQM and DM and an alarm (2) display indication for each of the modules except IQM. The alarm (1) condition alerts an operator to the need to provide additional pallets of unsorted cartons in the IQM or to remove the empty pallets from the OQM. The alarm (2) indication occurs for the OQM under the condition that it is full and the DM currently has an empty pallet, which cannot be discharged to the OQM because of its full condition, requiring system shut-down. Alarm (2) indications for the remaining modules generally indicate jam conditions, requiring system shut-down and operator intervention, i.e., to clear the jam.

With regard to the stacker bins (SM) of each of the various modules, the alarm portion 120B conveniently includes alarm (1) and alarm (2) indicators aligned with the identification of the stacker bins in portion 120A. In this instance, the alarm (1) condition indicates the pallet in the given stacker bin is full and serves to alert the operator to the need for removal of the full pallet and replacement thereof with an empty pallet. Again, the alarm (2) condition displays generally indicate a jam condition in the routing submodule (RS) or in the stacker bin (SB) component itself, requiring system shut-down and operator intervention.

Portion 120C includes basic system controls, illustrated by system start and stop switches.

Figure 12A:
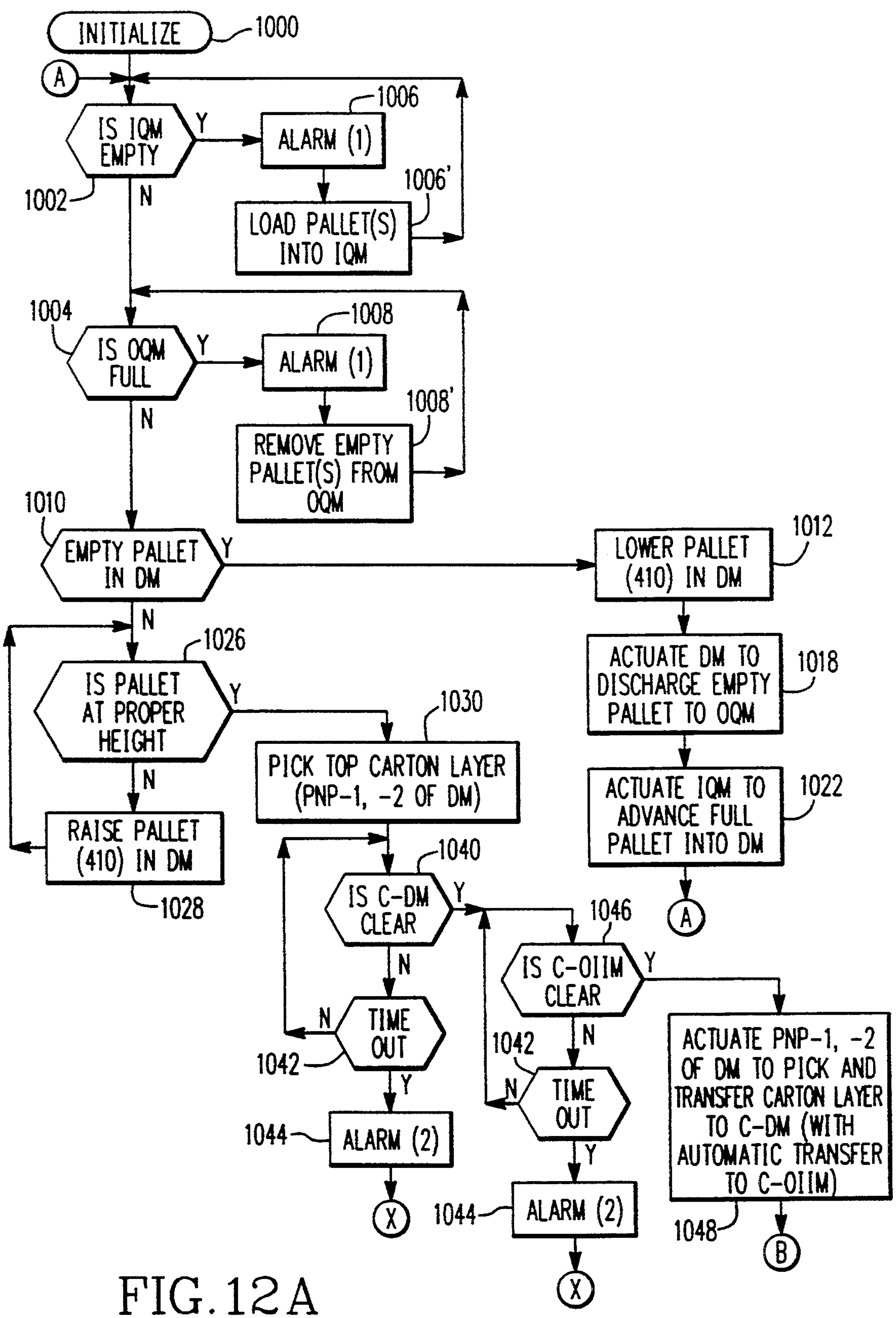
FIGS. 12A–12G collectively, comprises a flowchart of the system control logic and operational controls.

FIGS. 12A–12G indicate the basic logic flow of the system including the actuator controls produced by the system controller 12. FIG. 12A relates primarily to the IQM/DM, C-DM/and OQM modules. Initialize 1000 includes the operator functions of selectively designating the carton types for sorting in respective stacker bins (FIG. 11) and of manually setting the pallets in the correct positions in the stacker modules and adjusting the brackets 700, 701 (FIG. 9) for establishing the proper dimensions of the stacking channels STCH for the carton types designated for the respective bins SB. Where necessary, training the inspection module 550 for the particular cartons being run, if not previously accomplished is also performed.

At 1002 and 1004, the system checks whether the IQM is empty and whether the OQM is full and, if yes to either, sets corresponding alarm (1) conditions at 1006, 1008 to alert the operator that operator intervention then is required, for loading full pallets into the IQM, 1006', or removing empty pallets from the OQM, 1008' and the flow then returns to 1002, in each case. At 1010, a check is made to determine if an empty pallet is in the DM; if yes, mechanism 410 is actuated 1012 to lower the pallet in preparation for discharging same from the DM. Since at 1010 the OQM is not full (cf., 1004), the DM is actuated 1018 to discharge the empty pallet to the OQM; likewise, since at least one full pallet is available in the IQM (cf., 1002), the IQM is actuated 1022 to advance the next available full pallet into the DM and the cycle returns to A.

Returning to FIG. 12A, if the pallet in the DM is not empty at 1010, a check is made to assure the pallet is at the proper height, 1026, and if not, it is raised by mechanism 410, at 1028; when at the proper height, the appropriate one, in alternate succession, of the PNP-1 and PNP-2 devices of the DM then is actuated to pick a top carton layer at 1030. A check is made to determine whether the C-DM is clear to receive the picked carton layer at 1040; if not, and after a time-out 142 to permit the C-DM to transport a previously picked carton therefrom, an alarm (2) condition is set at 1044. If the C-DM is clear at 1040, the system determines whether the conveyor submodule for the orientation, identification and inspection module (i.e., C-OIIM) is clear 1046 and, if not and after a corresponding time-out 1042, an alarm (2) condition is set 1044, as before-described; since this time-out and alarm function is repeated for each of the successive modules, submodules and/or components thereof, the same are not further discussed. If C-OIIM is clear, SC 12 actuates 1048 the appropriate one of pick-n-place devices PNP-1 and PNP-2, in alternate succession, to transfer the carton layer (i.e., either the single, larger carton or the two, smaller cartons of a given layer) to C-DM and, in automatic sequence, to C-OIIM. While the system flow then proceeds to B in FIG. 12B for processing of the carton layer currently being transported through OIIM by the associated C-OIIM. The DM is controlled by SC 12 for removing a subsequent carton layer from the pallet. Thus, it will be understood that several cartons are processed simultaneously by the system, SC 12 retaining the identification of each and tracking its progress through the system and correspondingly controlling the successive operations of the various modules, as now discussed.

Figure 12B:
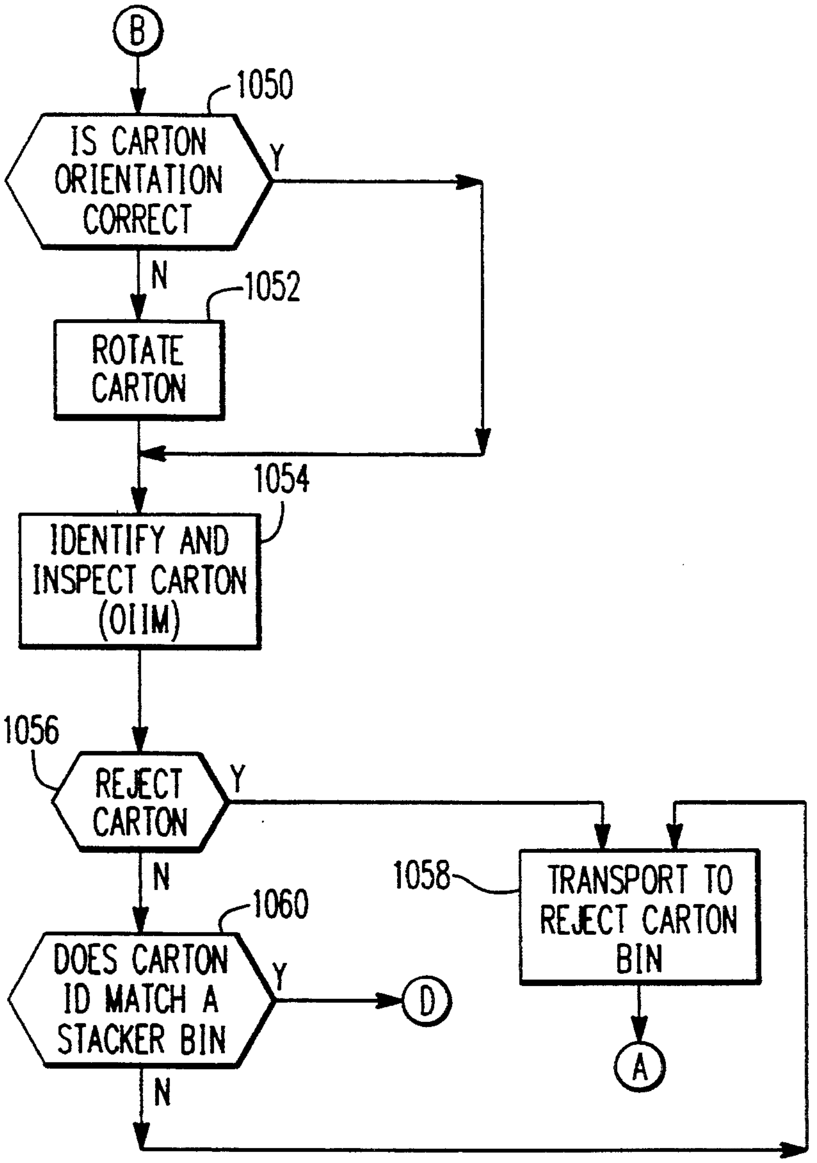
Figure 12C:
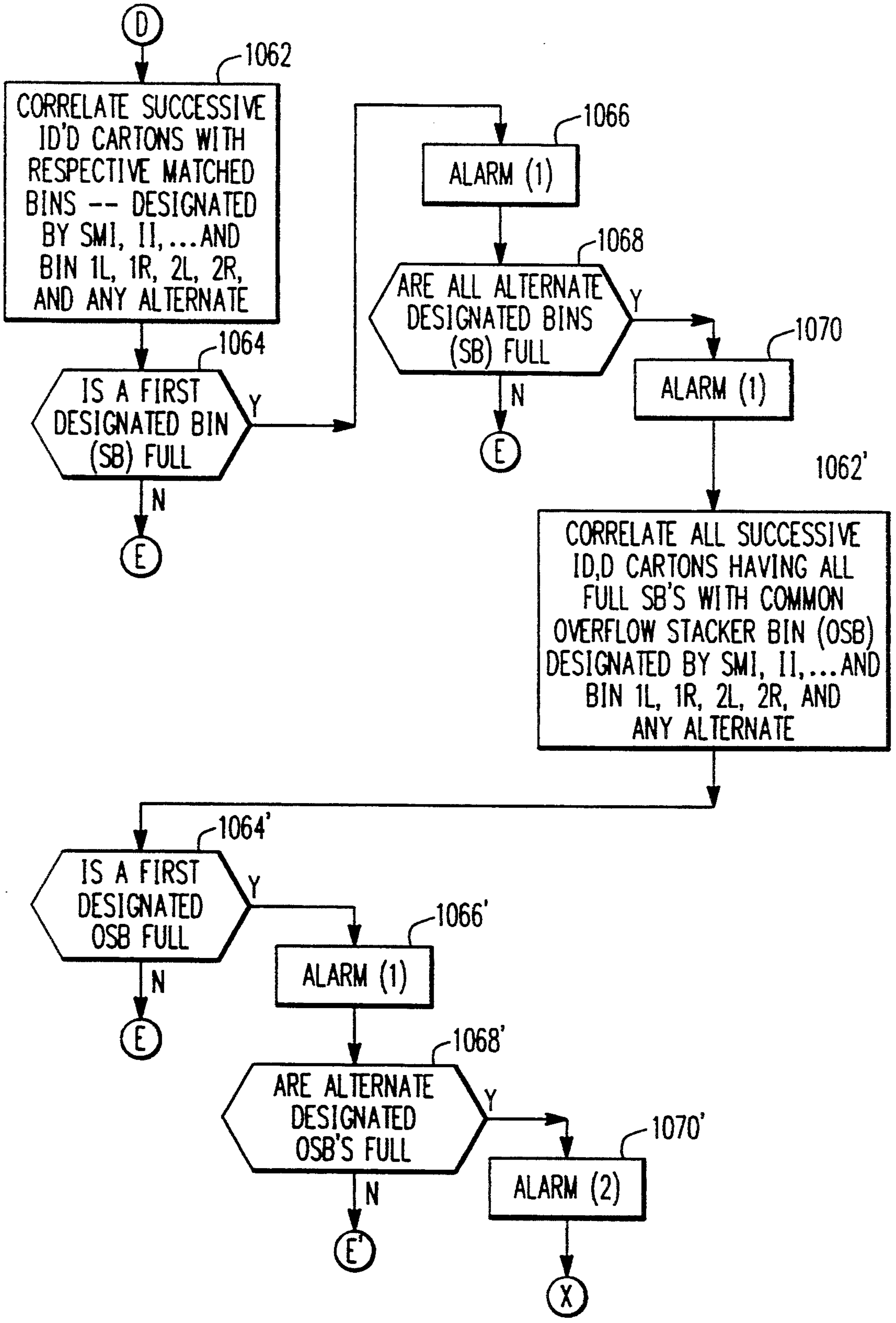

In FIG. 12B, the carton position is checked 1050 as to whether its longitudinal edge rests on the conveyor belt for proper transport and, if not, it is rotated by 90# at 1052 and then at 1054, now properly positioned, the carton enters and is processed by the OIIM. If the carton is not acceptable, it is designated for rejection 1056 and accordingly transported to the reject bin 1058. If it is acceptable and its identification type is determined by SC 12 to match a corresponding, designated stacker bin (SB) 1060, the system proceeds to D (FIG. 12C). If no match is found, the carton likewise is transported to the reject bin 1058. This circumstance could arise, for example, when a carton simply does not belong to the manufacturer and thus is not an "identifiable" carton or where the carton does not satisfy the acceptance criteria, etc.

FIG. 12C illustrates in the composite the continuing and real-time logic processing performed by SC 12 in relation to a succession of identified cartons ("ID'd CARTONS") which are at various transport locations relative to the stacking modules (SMI, SMII, . . . ) and respective stacking bins (SB), and which cartons and their respective locations are "tracked" in real time by SC 12. At 1062, each successive carton, as identified in OIIM, is associated, or logically linked, with its respective, matched and designated stacker bin SB—and thus as to the particular stacker module SMI, SMII, . . . , the respectively associated routing submodule (RS1R, RS2R, RS1L, RS1L—see FIG. 12D) and the specific stacker bin (SB1R, SB1L, SB2R, SB2L)—including, furthermore, "any alternate" such designated bin. Particularly, at least one alternate bin typically is designated so that when the pallet in a first designated SB is full, the system automatically reroutes successive, identified and acceptable cartons of that same type into the alternate designated SB and thereby permitting removal of the full pallet from the first SB, in a continuing and alternating succession. SC 12 furthermore tracks the transport of each identified and acceptable carton along the transport path TR in accordance with the known transport time of a carton through each successive module while also monitoring the successful passage of each successive carton through each successive module, as detected by the outputs of the photosensors associated with the respective modules.

Accordingly, for each identified carton and thus in time sequence for a plurality of successive, identified and acceptable cartons, the following steps are performed. At 1064, the system determines if a "first" designated SB is full and, if so, generates an alarm (1) condition 1066 for that "first" SB; the system next determines at 1068 if the alternate designated SB is full and, if so, the corresponding alarm (1) condition is issued 1070. While simplified for purposes of illustration of the flow, it will be appreciated that more than one alternate bin may be designated for a given type of carton; further, when a current, "first" designated bin is full and the alternate bin is not full and thus is selected to receive further cartons, the latter bin becomes the "first" designated bin and the previously "first" designated bin becomes the "alternate" bin. Accordingly, whichever of the pair (or plurality) of "first" and "alternate" designated bins is not full, the flow proceeds commonly to E, as shown identically for 1064 and 1068.

In the event that all of the "first" and any "alternate" designated SB's for a given carton type are full (i.e., steps 1064 and 1068), and thus corresponding alarms (1) are issued at 1066 and 1070, further such cartons are correlated at 1062' with a "first" (and any "alternate") designated overflow stacker bin(s) OSB(s). It will be understood that all cartons, regardless of type, for which all "designated" bins are full (i.e., 1064 and 1068), are commonly correlated at 1062' with the designated overflow bin(s) OSB(s); 1062' otherwise corresponds to 1062 and, likewise, 1064' and 1068' relate to the full condition of the designated and alternate overflow bins (OSB's) but correspond otherwise to 1064 and 1068. Similarly, alarm (1) at 1066' corresponds to 1066 if the first (i.e., any individual) such designated overflow bin (OSB) is full. However, if all designated overflow bins are full 1068', an alarm (2) condition is issued 1070' which, as seen in FIG. 12G, stops the system operation 1019. This is necessary since no further bin is available for these otherwise reusable cartons and, clearly, operator attention is necessary. Should excessive full conditions of the overflow bins occur, the operator typically will ascertain that one or more specific types of cartons have not been given SB designations and accordingly will enter same at the control system panel 120, which thereafter will result in automated sorting and stacking of these particular types of cartons in the newly-designated SB's, and halt the excessive full conditions of the overflow SB's.

Figure 12D:
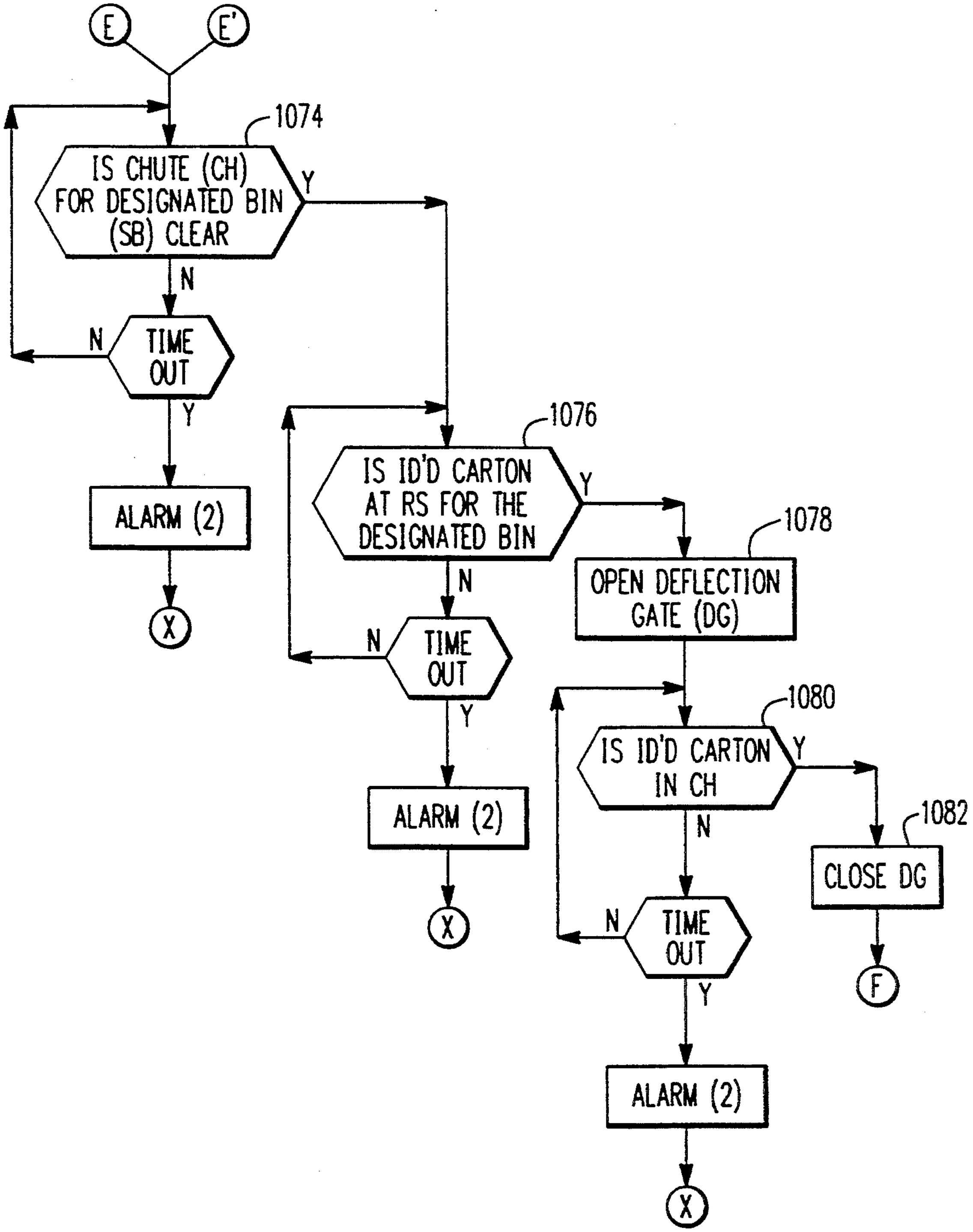

In FIG. 12D, the transport and routing functions for identified cartons destined for a designated SB, and thus for the respective routing submodule (RS)in each of SMI, SMII, . . . are the same, with respect to both larger (i.e., one per layer) and smaller (i.e., two per layer) cartons. The system first checks to determine that the chute CH is clear at 1074 and thus is ready to receive a subsequent carton and, if so, confirms 1076 that the identified carton next to be received in the designated SB has arrived at the routing submodule RS for that designated bin SB and, upon such arrival (1076), opens the deflection gate DG 1078 thereby to deflect the carton into the chute CH; it then confirms receipt of the carton in the chute CH 1080 and then closes the deflection gate DG 1082, the flow exiting to F of FIG. 12E for further processing of the current carton. As will be appreciated, upon closure of the deflection gate 1082, the chute is prepared for receiving a subsequent one of the cartons currently progressing through the corresponding, earlier stage of processing.

Figure 12E:
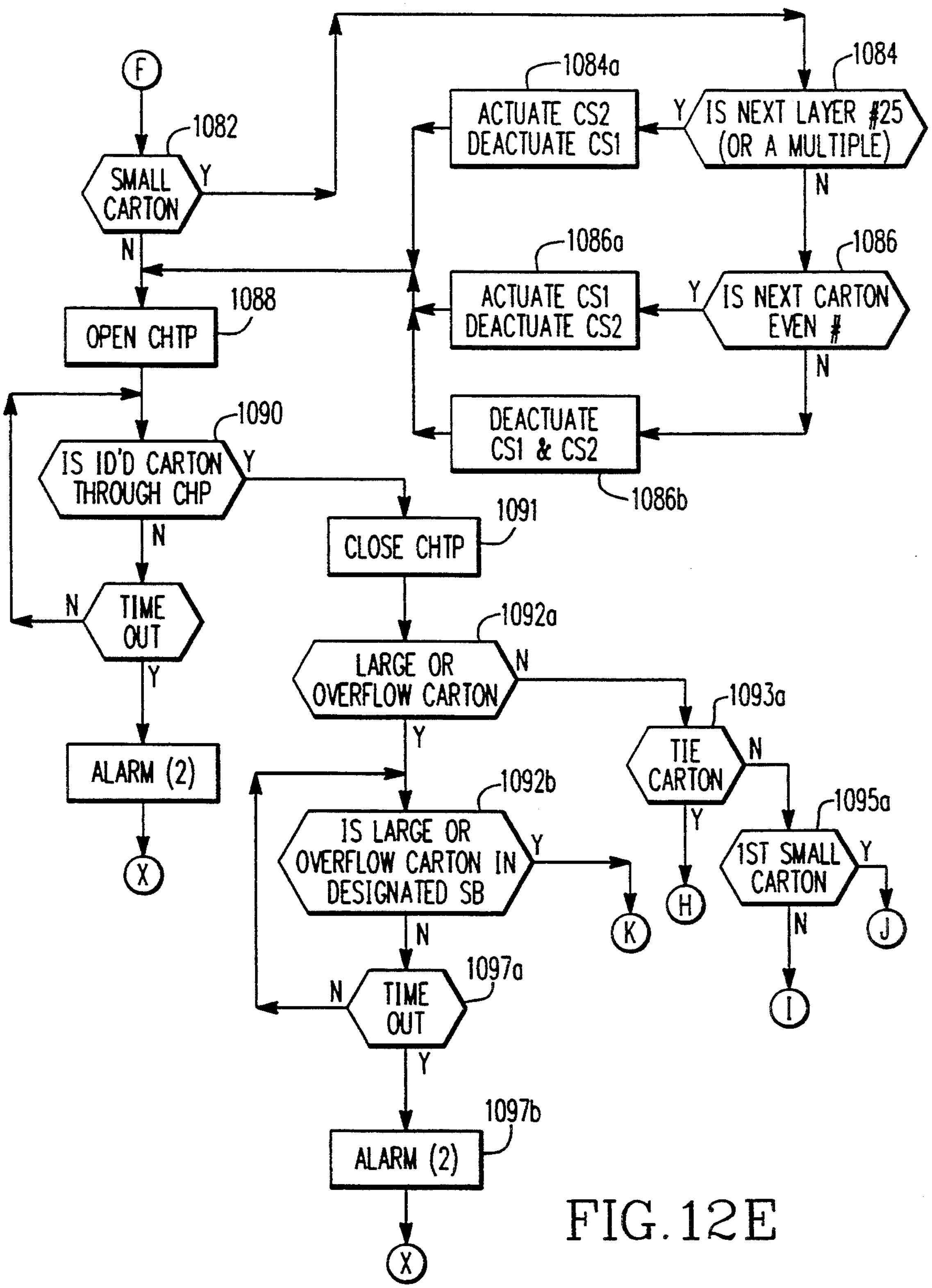

The stacker bin (SB) operation differs for large and overflow cartons (one to a layer) and small cartons (two to a layer) and is selectively established in advance, as before-noted, for each SB—and results in respective, different logic flow paths at 1082 and 1092a, in FIG. 12E. If the SB is designated for small cartons 1082, further processing is performed thereby to achieve not only side-by-side stacking of two (2) thereof in each layer but also the provision of the tie carton for every twenty-fifth layer. At each twenty-fifth layer in a stack 1084, CS 2 is actuated 1084a and then, following positioning of that single smaller carton as the tie carton of the twenty-fifth layer, CS 2 is deactuated 1084b. For each of the twenty-four layers preceding a next, twenty-fifth (single) tie carton layer, the determination is made 1086 whether the next carton is an even number, and thus the second carton for that layer; if so, CS 1 is actuated 1086a to thereby appropriately position the second carton in the SB. If the next carton not an even number (and thus the carton is the first of the two cartons for a given layer) 1086b, CS 1 is deactuated. The designated SB thus is prepared for proper receipt and positioning of each successive small carton, and the small carton flow returns, from each of 1084a to 1086b, to G.

The flow proceeds at 1088 in common for the individual carton currently in the chute CH, whether large or small. With respect to the individual carton now in the chute CH (cf., 1080 in FIG. 12D), the chute trap door CHTP is opened 1088, the passage of the carton through the chute CHP is monitored 1090 and the trap door CHTP is closed 1091.

Figure 12F:
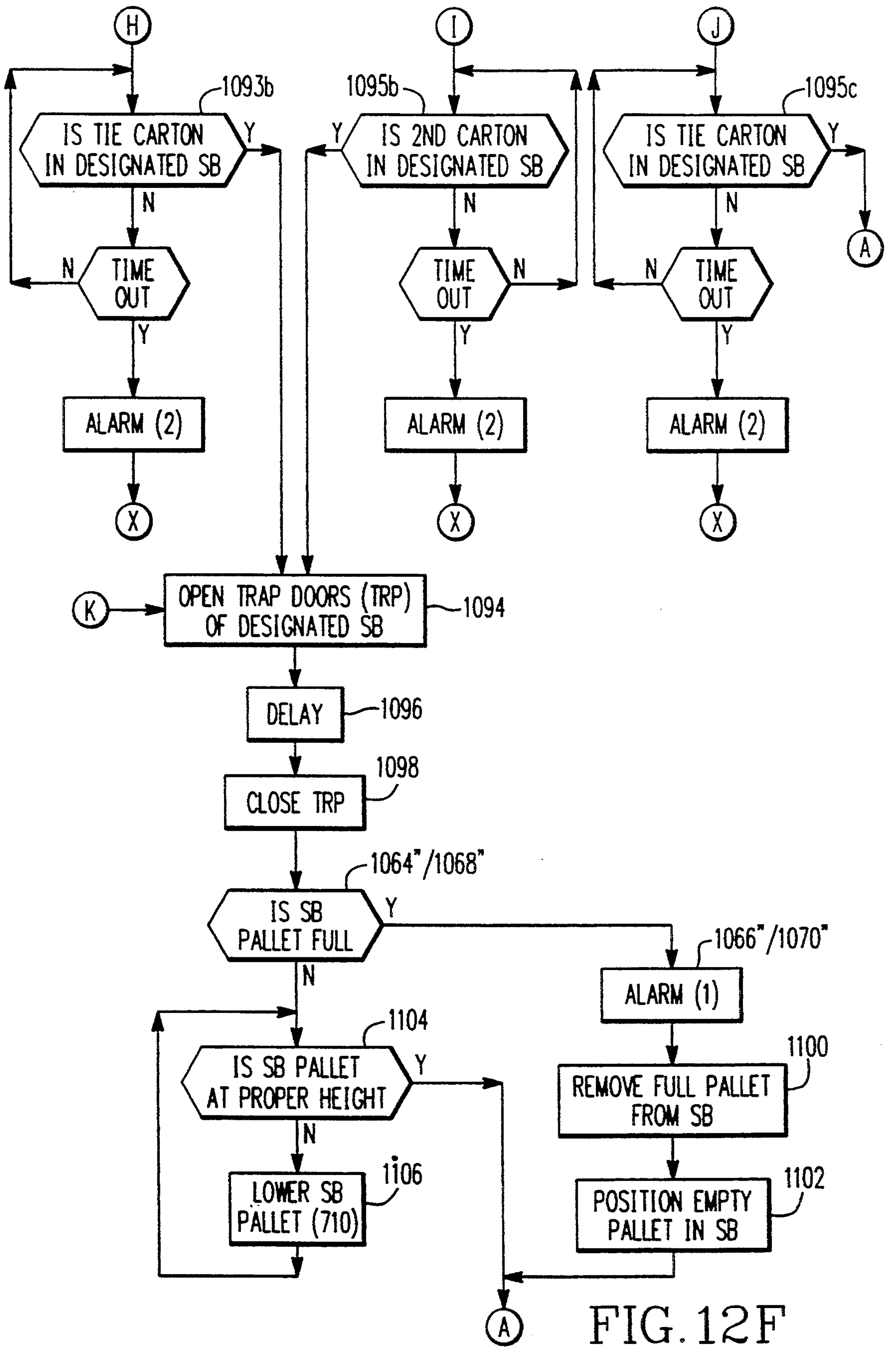
Figure 12G:
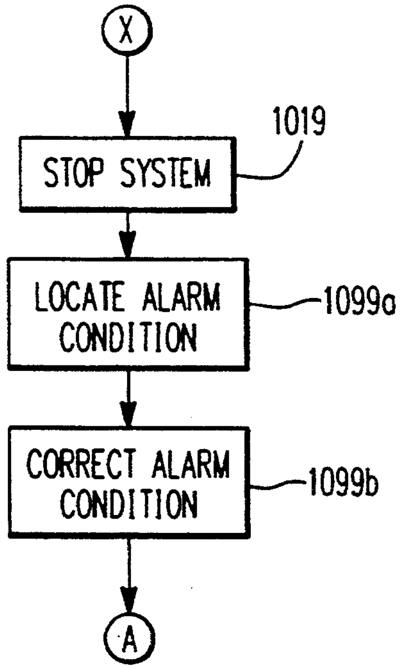

With concurrent reference to FIGS. 12E and 12F, if the bin is designated for a large carton or is an overflow bin for overflow cartons 1092a—and thus only a single carton per stacked layer is required,—when the carton is successfully removed 1092b in the designated SB (exiting from K to FIG. 12F), the trap doors TRP of the designated SB are opened 1094 and, after a suitable time-out 1096, then are closed 1098.

In the case of a bin SB designated for the smaller cartons 1092a, a single carton layer, to be stacked, comprises either first and second smaller cartons in side-by-side relationship, per layer, or a single tie carton for each twenty-fifth layer. If the next small carton passing through the chute CHP is a (small) tie carton 1093a and upon confirmation of its receipt in the designated SB 1093b, trap doors TRP are opened 1094 to drop the (single) tie carton onto the stack. If the next small carton is not a tie carton but is the first small carton of a layer 1095a, with flow exiting at J to FIG. 12F, upon confirmation of receipt of that first carton in the stacker bin SB 1095c, the flow returns to A (FIG. 12A) to await receipt of the second small carton for that SB. Upon receipt of the second small carton for that layer 1095a (with flow exiting at I from 1095a of FIG. 12E to FIG. 12F) and particularly upon confirmation 1095b that it is properly positioned in the designated SB—and thus two side-by-side cartons are now properly in position—the trap doors TRP are opened 1094 for dropping the (two small) carton layer onto the stack. At each of 1092b, 1093b, 1095b and 1095c, if confirmation of the involved carton being in the appropriate position in the designated SB is not achieved within the appropriate time interval set by the corresponding time-outs (e.g., 1097a), an alarm (2) condition (e.g., 1097b) is issued—indicating that a jam condition likely exists requiring operator attention, with the flow exiting to X of FIG. 12G.

Delay 1096 is set to the time required for a carton "layer" to drop onto the stack (which may be further, positively monitored by a suitable confirmation decision (not shown), e.g., as at 1092b, 1093b, 1095c). As will be appreciated, the control of the staged transport of cartons through the routing submodule and into the stacker bin occurs in a sufficiently rapid sequence that successive cartons of the same type may be transported to, and routed for stacking in, a common, designated SB.

If the SB pallet is full 1064''/1068'', an alarm (1) condition is issued 1066''/1070''. (Since relating to each SB, regardless of whether a "first" or an "alternate", the step 1064''/1068'' commonly represents all of 1064, 1068, 1064' and 1068' in FIG. 12C; likewise, the alarm (1) condition 1066''/1070'' represents commonly all of 1066, 1070, 1066'. The special case of alarm (2) condition 1070' of FIG. 12C is not illustrated in FIG. 12F for simplification and clarity, but of course is included.) The operator then intervenes, to remove 1100 the full pallet from the SB and to position 1102 an empty pallet in that same SB. The flow then exits to A of FIG. 12A.

If the SB pallet is not full and thus can receive a subsequent layer, a check is made to determine if the SB pallet is at the proper height 1104; if not, it is lowered 1106. When at the proper height 1104, the flow exits to A of FIG. 12A with the SB pallet at a proper height for receipt of one or more subsequent carton layers.

FIG. 12G indicates, in a composite sense, the previously-discussed sequence leading to an alarm (2) condition, which proceeds from X to system stop 1019 whereupon operator intervention is required to locate the alarm (2) condition 1099*a* and to correct same 1099*b*, following which the system flow returns at A to FIG. 12A.

Figure 13:
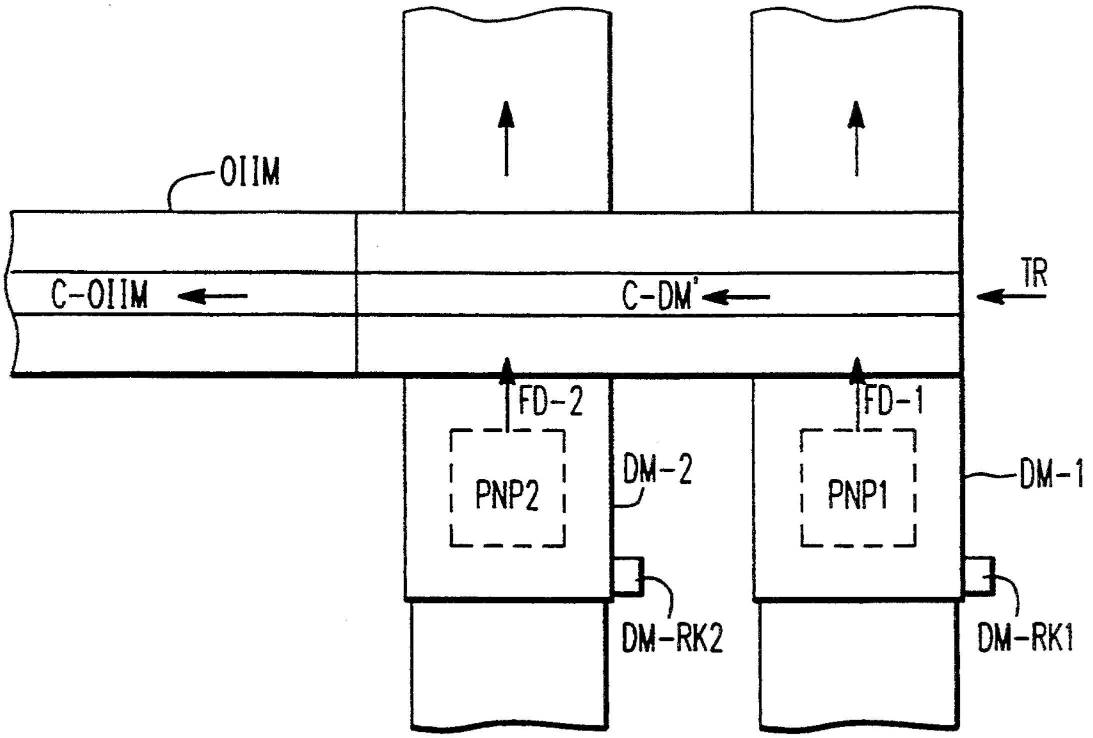
FIG. 13 is a partial plan view, in block diagram form corresponding to that of FIG. 1, illustrating an alternative system configuration.

FIG. 13 is a partial plan view, as in FIG. 1, of a modified form of the system of the invention incorporating two separate destacker modules DM-1 and DM-2 having respective signal racks DM-RK1 and DM-RK2, respectively, and respective, individual pick-n-place devices PNP1 and PNP1, which may be identical to and function in substantially the same way as the two correspondingly identified pick-n-place devices within the single DM of FIG. 1. In FIG. 13, however, the separate DM-1 and DM-2 provide corresponding, separate feed paths FP-1 and FP-2 for supplying corresponding, individual picked layers of cartons from the respective DM-1 and DM-2 to a common conveyor submodule C-DM'. SC 12 again responds to photosensor output signals which provide for monitoring the respective operations of PNP1 and PNP2 and for supplying controls thereto for feeding successive layers of cartons to C-DM'. Typically, PNP1 and PNP2 are actuated simultaneously and, due to their spacing and by controlled timing of actuation, they simultaneously deposit respective carton layers onto C-DM' for transfer thereby in serial succession and spaced relationship to the conveyor submodule C-OIIM of the OIIM module, as in the first embodiment of FIG. 1. Each layer, as before, may comprise a single larger carton or two smaller cartons in side-by-side relationship.

Figure 14:
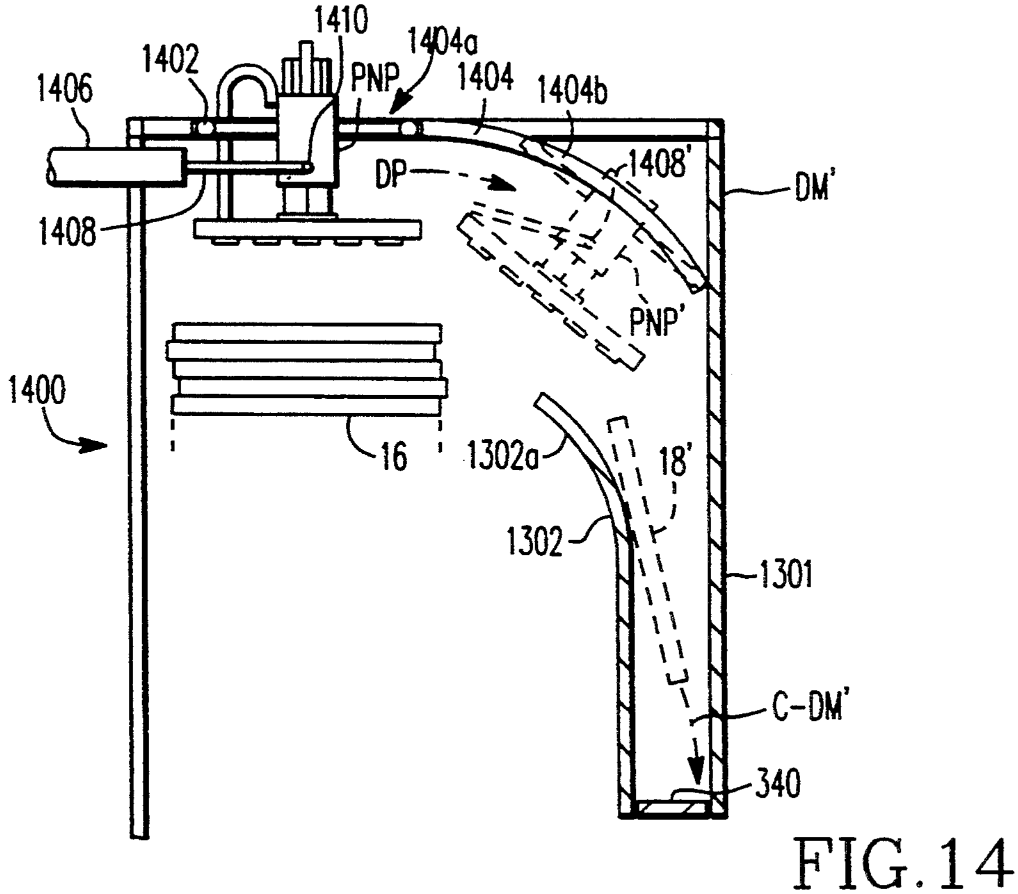
FIG. 14 is a side elevational view, corresponding to that of FIG. 3, of an alternative and preferred embodiment of a destacker module.

FIG. 14 is a side elevational view of a preferred embodiment of a destacker module DM' which may incorporate a single pick-n-place device PNP as in DM-1 and DM-2 or alternatively two such devices PNP1 and PNP2 as in the DM of FIG. 1. Only a single PNP device is illustrated in FIG. 14. An unsorted carton stack 16, shown schematically, is presented within housing 1400 of DM' in the same manner as in FIG. 3. The conveyor submodule C-DM', in this embodiment, is received within and effectively forms an integral part of DM', affording a more compact structure than DM 40 of FIG. 3. C-DM' includes an exterior wall 1301 and an interior wall 1302 having an upper, arcuately inwardly portion 1302*a*. The pick-n-place device PNP includes rollers 1402 which are received in and travel along a track 1404 including a horizontal portion 1404*a* and a downwardly curved portion 1404*b* integrally extending therefrom; an actuator 1406, secured to the housing 1400, includes a shaft 1408 pivotally connected at 1410 to the PNP and is controlled by SC 12 for moving the PNP between the rest or initial position shown in solid lines to the actuated position shown in phantom lines and identified by identical but primed numerals. The PNP operates as before to selectively remove a topmost carton layer from the stack 16 and to transport the removed layer through the destacking path DP, shown by the curved arrow, to the phantom line position of the PNP and thereupon to release the carton and permit same to drop by gravity, as shown in phantom lines at 18', for receipt in C-DM' and thereupon for transport by the conveyor belt 340 of C-DM' to the OIIM as seen in FIG. 13.

It will be appreciated from the foregoing that the system of the present invention affords fully automated processing of stacks of random cartons, including inspecting same for acceptability for reuse, properly orienting same for further processing and identifying same, and then routing cartons of a common and predesignated type into stacks in respective, predesignated stacker bins in a highly efficient and effective manner. Only minimal operator attention and intervention is required, in normal operation—essentially, simply that of supplying the unsorted stacks on pallets to the IQM and removing the empty pallets from the OQM and the full pallets of sorted stacks from the SB's, in a periodic sequence. Automated alarm (1) conditions alert the operator to the need for such normal pallet supply and removal actions, and alarm (2) conditions produce automated system stop to avoid damage to cartons and/or to the system while further advising the operator, through the control system panel indications, of the location and type of both the alarm (1) and (2) conditions. As is well known, pallet handling conveyors are available which may serve to further automate the functions of the system of the invention, if desired, such as for automatically removing the full, properly stacked pallets from the stacker bins and, if desired, for automatically conveying same to further processing equipment such as for automatically banding the stacked cartons on the pallet—e.g., for better stability and as may be desired for longer term storage. While the vertical and longitudinal edge orientation of the carton for purposes of transport through the stacking module is preferred, it is by no means limiting and instead the cartons may be differently oriented, such as on horizontal or slanted bed conveyors, for transport from the destacker module and through the OIIM and SM modules of the system. While the terms hydraulic and pneumatic have been used somewhat interchangeably or synonymously hereinabove, in a preferred embodiment, the lifts such as 410 and 710 would be hydraulically operated and the remaining actuators (e.g., 456 in FIG. 3, OGA1L, OGA1R in FIG. 7, etc.) would be pneumatically operated devices.

These and other modification and adaptations of the present invention will be apparent to those of skill in the art and thus it is intended by the appended claims to cover all such modifications and adaptations as fall within the true spirit and scope of the invention.

Consistent with the foregoing, the specific carton types desired to be sorted contain identification data such as length and height dimensions, or a bar code, or some other readable designation. Readable designations of specific carton types may include, for example, any one or more of various types of physical configurations as well as other indicia or coding. Types of physical configurations include, for example, dimensions, patterns (e.g. gaps or holes of particular shape, size, or location), and weight. Types of other indicia or coding include, for example, bar codes or other optically distinguishable markings (e.g. alphanumeric or geometric patterns, colors or gray scale) as well as any of a variety of magnetically or chemically distinguishable markings.

The readable designations are such as to be read by automated equipment (machine readable) and they may be but they are not necessarily applied to the carton solely for machine reading in a system in accordance with the invention. For example, otherwise existing physical characteristics (including length and height dimensions) or patterns (including printed labelling) can be used as the readable designations.

Any number of readable designations may be used on a single carton, perhaps differentiating different aspects of the carton, e.g. size, contents label, color, design, etc. Multiple readable designations may also be applied that are essentially duplicates for the same purpose, in case of obliteration by age or soiling.

The means for sensing or reading the identification data can be, for example, any optical, magnetic, tactile or chemical reading apparatus suitable for the particular type of readable designation for the data, of which many known types of apparatus are available. The sensing means provides a signal that allows specific identification of a specific carton type.

Thus, it is apparent that carton makers and users have available a wide variety of individually sortable carton identifications. In addition, any of the various types of readable designations can also be used to determine other aspects of carton handling and use.

For example, such readable designations as barcodes and dimensions (as well as any other of the above-mentioned readable designations) can also serve to enable automated placement of the cartons into a desired orientation. The same, or different, readable designations can be used for identification and orientation.

Figure 15:
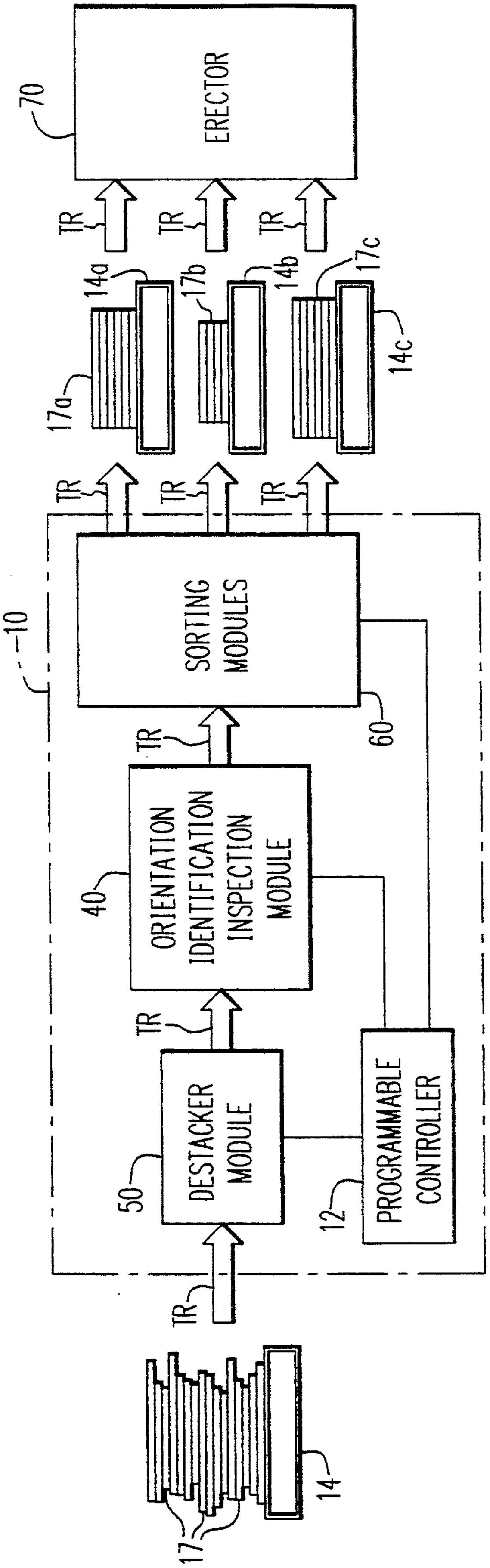
FIG. 15 is a schematic block diagram of a system in accordance with the invention.

FIG. 15 shows in schematic form the previously described system 10 in accordance with the present invention for purposes of further illustrating the versatility of the invention.

In this illustration, the pallet, or other transportable support, 14 carrying some number of unsorted cartons 17 is located to be received by, or for transport to, the Destacker Module 40 (DM). The Transport Path (TR) from and to the various modules is illustrated schematically by the large arrows. The DM 40 serially arranges the cartons 17 so they can be individually processed by the Orientation, Identification, Inspection Module 50(OIIM) or similar apparatus.

OIIM 50 includes optical, tactile, magnetic, or other means for reading machine readable designations, as described above, of the individual cartons, plus any types of condition inspection devices as previously described (e.g., submodule 550 of FIG. 10A). The sequence in which, as well as the means by which, identification, orientation (if any), and inspection (if any) are performed in the OIIM, or the extent to which these functions are performed in separate modules, is subject to variation.

For purposes of FIG. 15, Sorting Modules 60 (SM) are shown which schematically represents any desired number of individual sorting modules. SM60 includes at last modules for sorting the cartons 17 onto three pellets 14*a,* 14*b,* and 14*c* of specifically identified cartons 17*a,* 17*b* and 17*c,* in this example having differing sizes. Some number of reject and overflow bins may also be included but are not illustrated in FIG. 15. In the more general case, the Sorting Modules 60 may be such as to sort and stack any number of individual carton types for subsequent handling and use (i.e., forming a stack of any number including one).

FIG. 15 shows that any of the pallets with sorted (and otherwise processed) cartons 17*a,* 17*b,* 17*c* can be provided by an additional Transport Path segment TR to an Erector 70 for erecting or assembling cartons to the condition in which they may be filled.

One aspect of carton orientation is that previously described with regard to carton length and height dimensions. Another aspect of orientation of cartons that systems in accordance with this invention can readily address is that concerning carton folding. That is a matter that is important in erecting the flattened cartons for use which is performed by an Erector 70 that represents any known type of automated equipment for carton erection. Some commonly used types of such erection equipment require all the flattened cartons to be folded identically.

For example, when a previously erected carton is flattened, its top and bottom end flaps are extended in the planes of the respective sides and the carton, resting on one side surface, can be pushed flat by pushing the upper side surface either to the right or to the left of the surface on which the carton is resting resulting in a flattened or "folded" carton. If the carton has a square cross-section, the direction in which the flattening or folding occurs is generally immaterial as far as the erection equipment is concerned. However, if the carton has a rectangular cross-section with different sized sides, such as that illustrated in FIG. 16, it is usually important for the erection equipment to receive the flattened cartons all flattened, or folded, one way. An incorrectly flattened carton is commonly referred to as "back folded". Presently, some cartons have designations used for manually avoiding back folding. For example, just two of the lateral side surfaces may have a stripe printed on them. When the carton is flattened, the stripe is visible on both the two visible surfaces only if the carton is correctly folded. That assists in manual orientation of the cartons as has been practiced. Now, in accordance with the present invention, such a stripe, or any other readable designation, may be used in an automated system for making sure all the cartons in a sorted stack have a correct orientation, with backfolded cartons either among the rejects, or corrected by automated handling equipment such as using suction devices to hold a bottom flat surface in place while lifting an upper oriented surface by finger devices or suction devices and directing the upper part in the correct folding direction.

Figure 16:
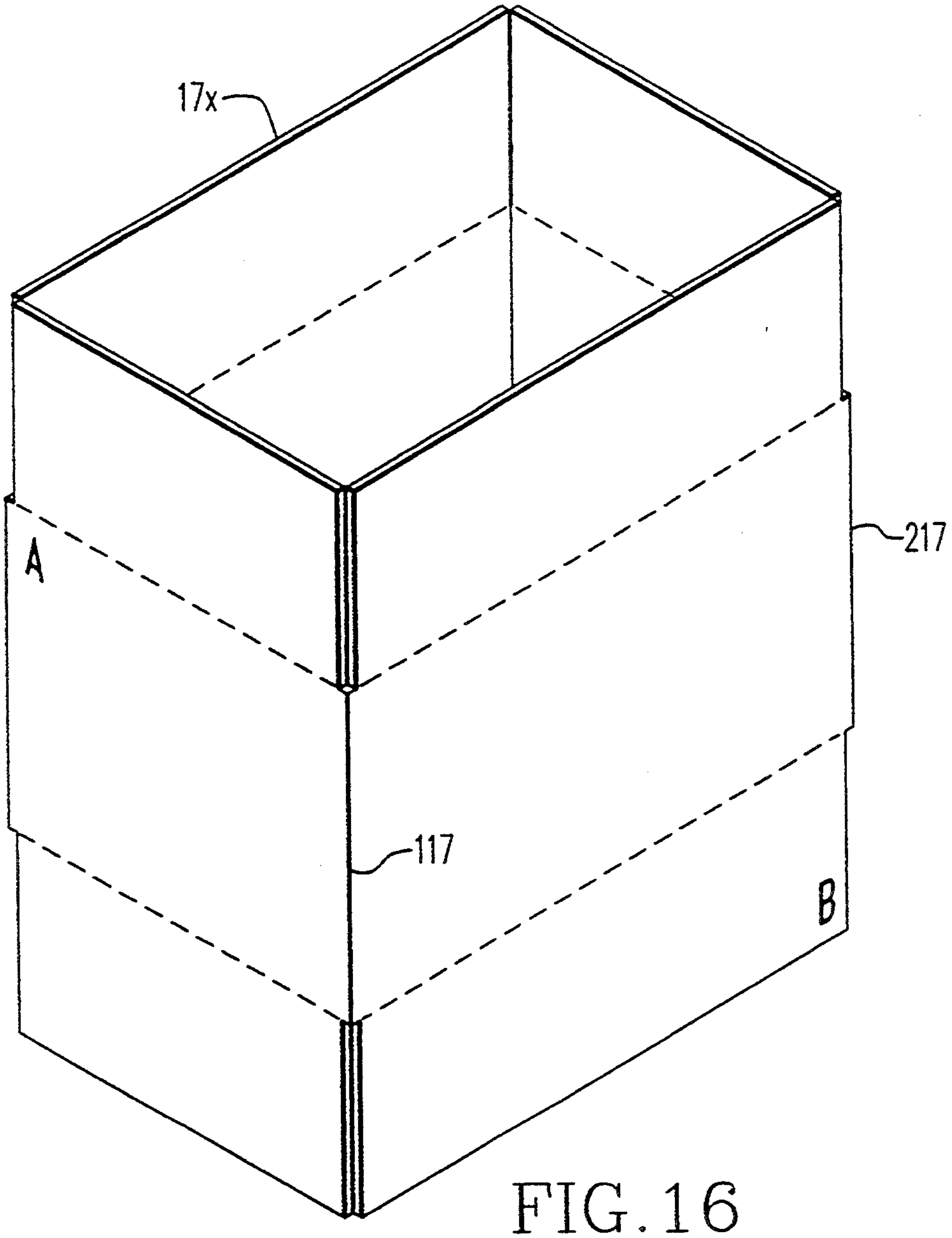
FIG. 16 is a perspective view of a carton for illustration of some aspects of the invention.

In FIG. 16, a carton 17*x* is shown that has a short side marked A and a long side with a closing flap marked B. The markings A and B are merely representative of any of the above-mentioned types of readable designations and their location.

Figure 17:
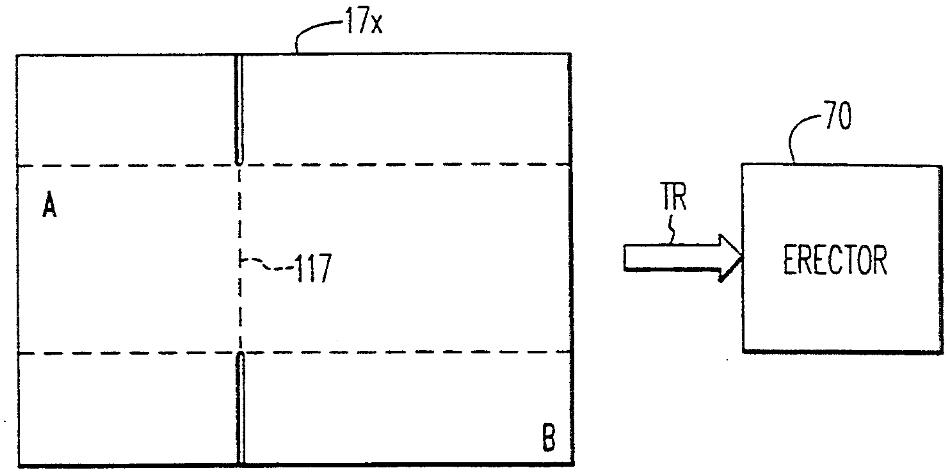
FIGS. 17, 18, and 19 are respective plan views of a folded carton as processed, or for processing, in accordance with the invention.
Figure 18:
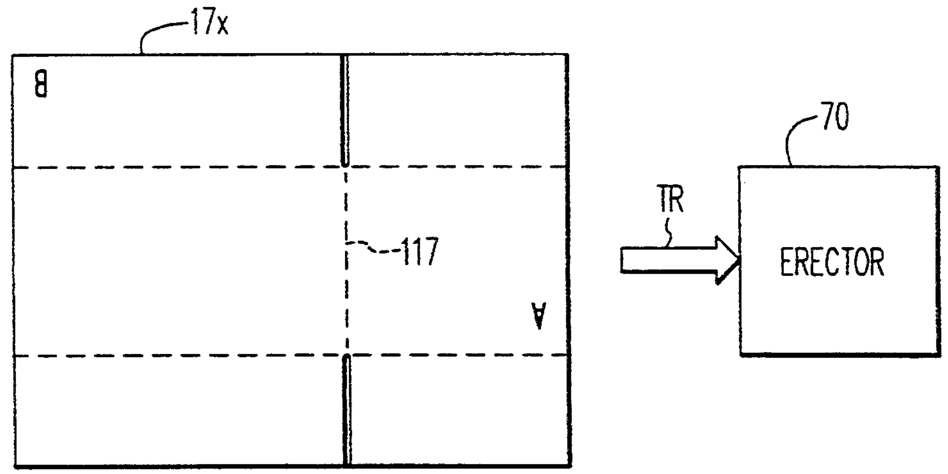

If the carton is flattened by flattening the edge 117, the flattened carton will appear as shown in FIG. 17. If carton 17*x* is to be correctly oriented for Erector 70, assume the marking B must be up and at the leading edge of the carton toward Erector 70. In that event, flattening in the same way but either having the side with marking B on the bottom (not shown), or at the trailing edge of the carton (FIG. 18) would be incorrect and the orientation module can be utilized to correct such misorientation. The readable designations, or their absence from the top surface, provide identifying data to do so.

Figure 19:
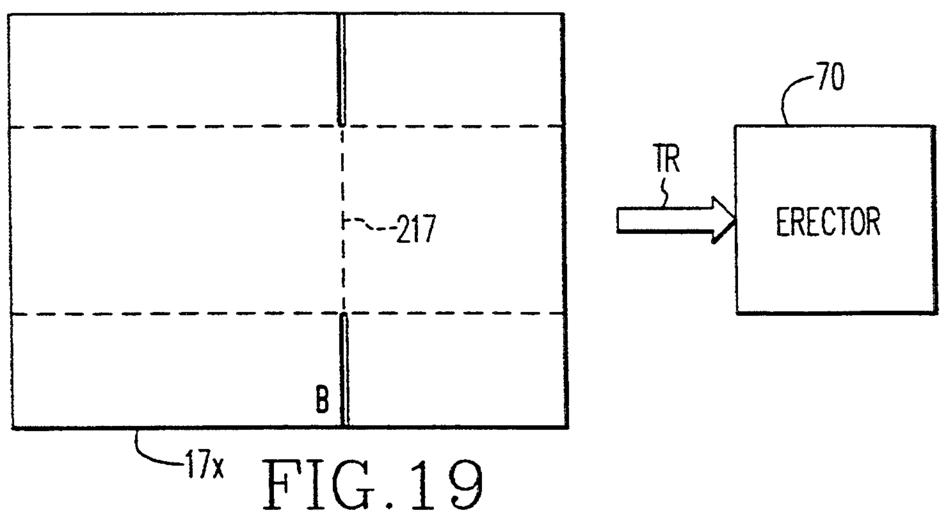

Additionally, in the case in which the carton has been backfolded by flattening edge 217, it would appear as shown in FIG. 19 and this, too, would be incorrect for Erector 70. However, the ability of the system to read that marking B is in the wrong location (or is absent from the correct location) allows detection and correction or elimination of any back folded cartons.

Furthermore, the capability of the invention extends to the orientation (or reorientation) of flattened cartons, as needed, into any possible orientation. Basic orientations of a flat carton include either of the two flattened surfaces on top and any particular edges aligned, without backfolds, for desired conditions to have automated delivery of the sorted, oriented stack to the erection equipment.

Reviewing another aspect of the versatility of the present invention, the number and arrangement of stacker bins may of course be varied as desired. For example, where cost and space saving of the equipment is a prime objective, the number of overflow bins need not match the number of bins for specific carton types; there may be one specific bin for each type to be sorted and a lesser number of variously located alternate or overflow bins to be used when a full stack is removed from one of the bins. Of course, the layout of a plurality of bins may also vary and may include arcuate arrangements as well as rectilinear arrangements of bins.

Accordingly, it is further apparent the concepts of the invention can be implemented in any of numerous ways in order to meet the needs and desires of carton users.

We claim:

1. A system for automatically processing, and facilitating reuse of, a supply of used cartons, in flattened form, in accordance with a selectable number of plural, different and separately identifiable carton types each having one or more readable designations thereon, the supply including plural, unsorted cartons of different types, comprising:

means for receiving unsorted cartons from the supply thereof and for transporting the received, unsorted cartons in a continuing, serial succession in a transport direction along a transport path;

means, disposed at a carton identifying position along said transport path, for sensing identifying data from each carton by reading at least one of the readable designations thereof for thereby identifying a carton as a specific one of the separately identifiable carbon types;

means for detecting an orientation of each carton by reading at least one of the readable designations thereof and for discriminating between cartons having a required orientation and cartons having other than the required orientation, said means for detecting an orientation including means for detecting at least one of (a) length-height orientation of each carton and (b) direction of folding orientation of each carton;

sorting means, disposed at a sorting position subsequent to said carton identifying position along said transport path, for sorting said identified cartons by type and including respectively associated routing and stacking means, said routing means being selectively operable for routing a carton from the serial succession thereof being transported along the transport path and into, and for receipt by, the associated stacking means, and the associated stacking means being selectively operable for stacking the received cartons in a predetermined number carton layers; and a reject bin disposed along said transport path, in addition to said stacking means, for receiving cartons from the sorting means that lack identifying data appropriate for said stacking means, whereby cartons received by said associated stacking means are ready for re-erection and reuse.

2. A system in accordance with claim 1, wherein:

said means for discriminating between cartons having a required orientation and cartons having other than the required orientation is accompanied by means for adjusting cartons initially having other than the required orientation to the required orientation before such cartons progress along said transport path.

3. A method for automatically processing, and facilitating reuse of, a supply of used cartons, in flattened form, in accordance with a selectable number of plural, different and separately identifiable carton types each having one or more readable designations thereon, the supply including plural, unsorted cartons of different types, comprising:

receiving selected, unsorted cartons from the supply thereof;

transporting the received, unsorted cartons in a continuing, serial succession in a transport direction along a transport path;

at a selected position along said transport path, sensing identifying data from each carton by reading at least one of the readable designations thereof, and identifying a carton as a specific one of the separately identifiable carton types;

at another selected position along said transport path, detecting an orientation of each carton by reading at least one of the readable designations thereof and discriminating between cartons having a required orientation from cartons having other than a required orientation, said detecting an orientation including detecting at least one of (a) length-height orientation of each carton and (b) direction of folding orientation of each carton;

selectively designating stacking locations for respective, separately identifiable carton types, at each of which designated stacking locations a stack of identified cartons of the respective, matching and therefor common type is to be stacked in successive layers;

defining routing positions along the transport path respectively corresponding to the designated stacking locations;

determining a match of each identified carton, by type, with corresponding, designated stacking locations;

tracking the identified cartons of the serial succession thereof during transport thereof along the transport path and, at the routing position associated with a designated stacking location matching the type of an identified carton being transported along the transport path, routing the carton from the transport path to the respective stacking location of the matching type and stacking successive said routed, matching cartons in successive carton layers at the stacking location, and routing any carton not matching the type of an identified carton to a reject bin, whereby cartons received by said designated stacking location are ready for re-erection and reuse.

4. A method in accordance with claim 3 wherein:

said discriminating between cartons having a required from another orientation is followed by adjusting cartons initially having another orientation to the required orientation.

5. An automated carton sorting system to facilitate reuse of a plurality of cartons, existing in a flattened state, unsorted as to types or orientation of cartons, each of the cartons having one or more machine readable designations of carton type and carton orientation, comprising:

means for reading one or more of the readable designations of each carton;

means for orienting the unsorted cartons according to the reading of the readable designations;

said means for reading including means for reading by any of one or more optical, magnetic, tactile, or chemical sensitive devices selected in accordance with characteristics of the readable designations of the cartons which are any one or more of carton dimensions, patterns, weight, and markings, said means for orienting includes means for orienting according to required carton length and height dimensions and according to required folding direction;

means for sorting the unsorted cartons according to the reading of the readable designations;

means for routing and stacking the oriented and sorted cartons, wherein said means for routing and stacking produces a stack of sorted cartons with a uniform orientation as predetermined for assembly by an automated carton erector; and means for controlling the orienting, sorting, routing and stacking of the cartons including a programmable controller.

* * * * *